United States Patent
Pettersson et al.

(10) Patent No.: US 12,238,316 B2
(45) Date of Patent: Feb. 25, 2025

(54) DETERMINING CAPABILITY TO DECODE A FIRST PICTURE IN A VIDEO BITSTREAM

(71) Applicant: Telefonaktiebolaget LM Ericsson (publ), Stockholm (SE)

(72) Inventors: Martin Pettersson, Vallentuna (SE); Rickard Sjöberg, Stockholm (SE); Mitra Damghanian, Upplands-Bro (SE); Ruoyang Yu, Täby (SE); Jacob Ström, Stockholm (SE); Jack Enhorn, Kista (SE); Du Liu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 63 days.

(21) Appl. No.: 18/008,644

(22) PCT Filed: Jun. 7, 2021

(86) PCT No.: PCT/SE2021/050541
§ 371 (c)(1),
(2) Date: Dec. 6, 2022

(87) PCT Pub. No.: WO2021/251878
PCT Pub. Date: Dec. 16, 2021

(65) Prior Publication Data
US 2023/0308668 A1      Sep. 28, 2023

Related U.S. Application Data

(60) Provisional application No. 63/036,080, filed on Jun. 8, 2020.

(51) Int. Cl.
*H04N 19/44* (2014.01)
*H04N 19/169* (2014.01)
(Continued)

(52) U.S. Cl.
CPC ........... *H04N 19/44* (2014.11); *H04N 19/172* (2014.11); *H04N 19/188* (2014.11); *H04N 19/70* (2014.11)

(58) Field of Classification Search
CPC .... H04N 19/44; H04N 19/172; H04N 19/188; H04N 19/70
See application file for complete search history.

(56) References Cited

U.S. PATENT DOCUMENTS

| 2014/0112383 A1 | 4/2014 | Yang et al. |
| 2015/0016542 A1 | 1/2015 | Rosewarne et al. |

(Continued)

FOREIGN PATENT DOCUMENTS

WO    WO 2020/122574 A1    6/2020

OTHER PUBLICATIONS

Extended European Search Report, European Patent Application No. 21821243.9, mailed Dec. 8, 2023, 7 pages.

(Continued)

*Primary Examiner* — Jonathan R Messmore
(74) *Attorney, Agent, or Firm* — Sage Patent Group

(57) ABSTRACT

A method and decoder for determining that a decoder conforming to a first profile is capable of decoding a first picture of a video bitstream conforming to a second profile is provided. The method includes obtaining an indicator value, the indicator value indicating conformance to a profile. The method includes determining whether the first picture in the video bitstream is a still picture. The method includes responsive to the indicator value indicating conformance to the second profile and the first picture is determined to be a still picture, determining that the decoder conforming to the first profile is capable of decoding the first picture of the video bitstream.

21 Claims, 8 Drawing Sheets

(51) Int. Cl.
  *H04N 19/172* (2014.01)
  *H04N 19/70* (2014.01)

(56) References Cited

U.S. PATENT DOCUMENTS

| | | |
|---|---|---|
| 2016/0286239 A1 | 9/2016 | Sato |
| 2016/0295211 A1 | 10/2016 | Sato |
| 2020/0128263 A1* | 4/2020 | Mittal ................. H04N 19/136 |

OTHER PUBLICATIONS

Bross, B., et al., "Versatile Video Coding (Draft 9)," Joint Video Experts Team (JVET), Joint Video Experts Team (JVET) 18th Meeting, by teleconference, Apr. 20-24, 2020, JVET-R2001 vA, 524 pages.

International Search Report and Written Opinion of the International Searching Authority, PCT/SE2021/050541, mailed Aug. 20, 2021, 13 pages.

Pettersson, M., et al., "On Definition of the VVC Still Picture Profiles," Joint Video Experts Team (JVET) of ITU-T SG 16 WP 3 and ISO/IEC JTC 1/SC 29/WG 11, 19th Meeting: by teleconference, Jun. 22-Jul. 1, 2020, JVET-S0210-v1, 6 pages.

Search Report, Taiwan Patent Application No. 110120597, mailed May 11, 2022, 5 pages.

* cited by examiner

RESPONSIVE TO THE INDICATOR VALUE INDICATING CONFORMANCE TO A THIRD PROFILE OR THE FIRST PICTURE IS DETERMINED TO NOT BE A STILL PICTURE:

DETERMINING THAT THE BITSTREAM DOES NOT CONFORM TO THE FIRST PROFILE
1101

DETERMINING THAT THE DECODER MAY NOT BE CAPABLE OF DECODING THE FIRST PICTURE OF THE VIDEO BITSTREAM
1103

Figure 11

DETERMINING WHETHER THE FIRST PICTURE IS THE ONLY PICTURE IN THE BITSTREAM
1201

RESPONSIVE TO THE INDICATOR VALUE INDICATING CONFORMANCE TO THE SECOND PROFILE AND THE FIRST PICTURE DETERMINED TO BE A STILL PICTURE AND THE FIRST PICTURE IS DETERMINED TO BE THE ONLY PICTURE IN THE BITSTREAM, DETERMINING THAT THE DECODER IS CAPABLE OF DECODING THE FIRST PICTURE OF THE VIDEO BITSTREAM.
1203

Figure 12

DETERMINING CAPABILITY TO DECODE A FIRST PICTURE IN A VIDEO BITSTREAM

CROSS REFERENCE TO RELATED APPLICATIONS

This application is a 35 U.S.C. § 371 national stage application of PCT International Application No. PCT/SE2021/050541 filed on Jun. 7, 2021, which in turn claims domestic priority to U.S. Provisional Patent Application No. 63/036,080, filed on Jun. 8, 2020, the disclosures and content of which are incorporated by reference herein in their entirety.

TECHNICAL FIELD

The application relates to methods and apparatuses for video encoding and decoding.

BACKGROUND

HEVC and VVC

High Efficiency Video Coding (HEVC) is a block-based video codec standardized by the ITU-T (Telecommunication Standardization Sector of the International Telecommunications Union) and the MPEG (Moving Pictures Expert Group) that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

The MPEG and the ITU-T are working on the successor to HEVC within the Joint Video Exploratory Team (JVET). The name of this video codec under development is Versatile Video Coding (VVC). The current version of the VVC specification is JVET-S0152-v5.

Components

A video sequence consists of a series of images where each image consists of one or more components. Each component can be described as a two-dimensional rectangular array of sample values. Typically, an image in a video sequence consists of three components: one luma component Y where the sample values are luma values and two chroma components Cb and Cr, where the sample values are chroma values. Typically, the dimensions of the chroma components are smaller than the luma components by a factor of two in each dimension. For example, the size of the luma component of a High Definition (HD) image would be 1920×1080 and the chroma components would each have the dimension of 960×540. Chroma components are sometimes referred to as color components.

Blocks and Units

A block is a two-dimensional array of samples. In video coding, each component is split into blocks and the coded video bitstream consists of a series of blocks. Typically, in video coding, the image is split into units that cover a specific area of the image. Each unit consists of all blocks from all components that make up that specific area and each block belongs to one unit. The macroblock in H.264 and the Coding Unit (CU) in High Efficiency Video Coding (HEVC) and the current version of VVC are examples of units. CUs may be split recursively to smaller CUs. The CU at the top level is referred to as the Coding Tree Unit (CTU).

A block can alternatively be defined as a two-dimensional array that a transform used in coding is applied to. These blocks are referred to under the name "transform blocks". Alternatively, a block can be defined as a two-dimensional array that a single prediction mode is applied to. These blocks can be called "prediction blocks." In this application, the term "block" is not tied to any particular one of these definitions as the description herein can apply to either definition.

NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC and the current version of VVC begins with a header called the NAL unit header. The syntax for the NAL unit header for HEVC and the current version of VVC starts with a forbidden_zero_bit that shall always be equal to 0 to prevent start code emulations. Without it, some MPEG systems might confuse the HEVC video bitstream and the VVC video bitstream with other data, but the 0 bit in the NAL unit header makes all possible HEVC bitstreams and VVC bitstreams uniquely identifiable as HEVC bitstreams of VVC bitstreams. The nal_unit_type, nuh_layer_id and nuh_temporal_id_plus1 code words specify the NAL unit type of the NAL unit that identifies what type of data is carried in the NAL unit, the layer ID and the temporal ID for which the NAL unit belongs to. The NAL unit type indicates and specifies how the NAL unit should be parsed and decoded. The NAL unit header in the current version of VVC, shown in Table 1, is very similar to the one in HEVC, but uses 1 bit less for the nal_unit_type and instead reserves this bit for future use.

The rest of the bytes of the NAL unit is payload of the type indicated by the NAL unit type. A bitstream consists of a series of concatenated NAL units.

TABLE 1

| VVC NAL unit header syntax | |
|---|---|
|  | Descriptor |
| Nal_unit_header( ) { |  |
|    forbidden_zero_bit | f(1) |
|    nuh_reserved_zero_bit | u(6) |
|    nuh_layer_id | u(6) |
|    nal_unit_type | u(5) |
|    nuh_temporal_id_plus1 | u(3) |
| } |  |

A decoder or bitstream parser can conclude how the NAL unit should be handled, e.g. parsed and decoded, after looking at the NAL unit header. The rest of the bytes of the NAL unit is payload of the type indicated by the NAL unit type. A bitstream consists of a series of concatenated NAL units.

The decoding order is the order in which NAL units shall be decoded, which is the same as the order of the NAL units within the bitstream. The decoding order may be different from the output order, which is the order in which decoded pictures are to be output, such as for display, by the decoder.

The NAL unit type indicates and defines how the NAL unit should be parsed and decoded. A VCL NAL unit provides information about the picture type of the current picture. The NAL unit types of the current version of the VVC draft are shown in Table 2.

instance, it is not allowed for a picture of a temporal layer to reference a picture of a higher temporal layer.

Picture Unit, Access Unit and the Access Unit Delimiter

A picture unit (PU) in the current version of VVC is defined as a set of NAL units for which the VCL NAL units all belong to the same layer, that are associated with each other according to a specified classification rule, that are

TABLE 2

NAL unit types in the current version of the VVC draft

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture or subpicture* slice_layer_rbsp( ) | VCL |
| 8 | IDR_N_LP | | |
| 9 | CRA_NUT | Coded slice of a CRA picture or subpicture* silce_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

Temporal Layers

In HEVC and in the current version of the VVC draft, all pictures are associated with a TemporalId value which specifies what temporal layer the picture belongs to. TemporalId values are decoded from the nuh temporal_id_plus1 syntax element in the NAL unit header. In HEVC, the encoder is required to set TemporalId values such that pictures belonging to a lower layer is perfectly decodable when higher temporal layers are discarded. Assume for instance that an encoder has output a bitstream using temporal layers 0, 1 and 2. Then removing all layer 2 NAL units or removing all layer 1 and 2 NAL units will result in bitstreams that can be decoded without problems. This is ensured by restrictions in the HEVC specification and the VVC specification that the encoder must comply with. For consecutive in decoding order, and that contain exactly one coded picture. In previous versions of VVC, the PU was called layer access unit. In HEVC, the PU is referred to as an access unit (AU).

In VVC, an access unit is a set of PUs that belong to different layers and contain coded pictures associated with the same time for output from the decoded picture buffer (DPB), i.e. having the same POC value.

An access unit, in the current version of VVC, may start with an access unit delimiter (AUD) NAL unit which indicates the start of the access unit and the type of the slices allowed in the coded picture, i.e. I, I-P or I-P-B and whether the access unit is an IRAP or GDR access unit. In HEVC, it is optional for an access unit to start with an AUD. The syntax and semantics for the access unit delimiter NAL unit in the current version of the VVC draft is shown below in Table 3.

TABLE 3

Access Unit delimiter RBSP syntax in the current version of the VVC draft

| | Descriptor |
|---|---|
| access_unit_delimiter_rbsp( ) { | |
|     aud_irap_or_gdr_au_flag | u(1) |
|     aud_pic_type | u(3) |
|     rbsp_trailing_bits( ) | |
| } | | aud_irap_or_gdr_au_flag equal to 1 specifies that the AU containing the AU delimiter is an IRAP or GDR AU. aud_irap_or_gdr_au_flag equal to 0 specifies that the AU containing the AU delimiter is not an IRAP or GDR AU.

aud_pic_type indicates that the sh_slice_type values for all slices of the coded pictures in the AU containing the AU delimiter NAL unit are members of the set listed in Table 4 for the given value of aud_pic_type. The value of aud_pic_type shall be equal to 0, 1 or 2 in bitstreams. Other values of aud_pic_type are reserved for future use by ITU-T|ISO/IEC. Decoders conforming to this version of this Specification shall ignore reserved values of aud_pic_type.

TABLE 4

Interpretation of aud_pic_type

| aud_pic_type | sh_slice_type values that may be present in the AU |
|---|---|
| 0 | I |
| 1 | P, I |
| 2 | B, P, I |

Layers—Dependent and Independent Layers

Layers are defined in VVC as a set of VCL NAL units that all have a particular value of nuh_layer_id and the associated non-VCL NAL units.

A coded layer video sequence (CLVS) in the current version of VVC is defined as a sequence of PUs that consists, in decoding order, of a CLVS start (CLVSS) PU, followed by zero or more PUs that are not CLVSS PUs, including all subsequent PUs up to but not including any subsequent PU that is a CLVSS PU.

The relation between the PU, AU, and CLVS is illustrated in FIG. 1.

In the current version of VVC, layers may be coded independently from each other, i.e. a layer with e.g. nuh_layer_id 0 may not predict video data from another layer with e.g. nuh_layer_id 1. In the current version of VVC, dependent coding between layers may also be used, which enables support for scalable coding with SNR, spatial and view scalability.

Picture Order Count (POC)

Pictures in HEVC are identified by their picture order count (POC) values, also known as full POC values. Each slice contains a code word, pic_order_cnt_lsb, that shall be the same for all slices in a picture. pic_order_cnt_lsb is also known as the least significant bits (lsb) of the full POC since it is a fixed-length code word and only the least significant bits of the full POC is signaled. Both encoder and decoder keep track of POC and assign POC values to each picture that is encoded/decoded. The pic_order_cnt_lsb can be signaled by 4-16 bits. There is a variable MaxPicOrderCntLsb used in HEVC which is set to the maximum pic_order_cnt_lsb value plus 1. This means that if 8 bits are used to signal pic_order_cnt_lsb, the maximum value is 255 and MaxPicOrderCntLsb is set to 2^8=256. The picture order count value of a picture is called PicOrderCntVal in HEVC. Usually, PicOrderCntVal for the current picture is simply called PicOrderCntVal. POC is expected to work in a similar way in the final version of VVC.

Intra Random Access Point (IRAP) Pictures and the Coded Video Sequence (CVS)

An intra random access point (IRAP) picture in HEVC is a picture that does not refer to any picture other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture, and the clean random access (CRA) picture.

A coded video sequence (CVS) in HEVC is a sequence of access units starting at an IRAP access unit followed by zero or more AUs up to, but not including the next IRAP access unit in decoding order.

IDR pictures always start a new CVS. An IDR picture may have associated random access decodable leading (RADL) pictures. An IDR picture does not have associated random access skipped leading (RASL) pictures.

A BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft, a CVS is a sequence of access units starting at a CVS start (CVSS) access unit followed by zero or more AUs up to, but not including the next CVSS access unit in decoding order. A CVSS access unit may contain an IRAP picture, i.e., an IDR or a CRA picture, or a gradual decoding refresh (GDR) picture. A CVS may contain one or more CLVSs.

GDR pictures are essentially used for random access in bitstreams encoded for low-delay coding where a full IRAP picture would cause too much delay. A GDR picture may use gradual intra refresh that updates the video picture by picture where each picture is only partially intra coded. A recovery POC count is signaled with the GDR picture that specifies when the video is fully refreshed and ready for output, given that the bitstream was tuned in at the GDR picture. A GDR picture in VVC may start a CVS or CLVS. GDR pictures are included in the current VVC draft but are not a normative part of the HEVC standard, where it instead may be indicated with an SEI message.

Slice

The concept of slices in HEVC divides the picture into independently coded slices, where decoding of one slice in a picture is independent of other slices of the same picture. In a previous version of the VVC draft specification, slices were referred to as tile groups.

One purpose of slices is to enable resynchronization in case of data loss. In HEVC, a slice is a set of CTUs. Slices are also supported in the current version of VVC, and a VVC picture may be partitioned into either raster scan slices or rectangular slices. A raster scan slice consists of a number of complete tiles in raster scan order. A rectangular slice consists of a group of tiles that together occupy a rectangular region in the picture or a consecutive number of CTU rows inside one tile. Each slice has a slice header comprising syntax elements. Decoded slice header values from these syntax elements are used when decoding the slice. Each slice is carried in one VCL NAL unit.

Each slice has a slice type which defines the coding type (i.e. type of prediction) used by the slice, i.e. whether a slice is an intra prediction coded I slice, uni-directional prediction coded P slice or a bi-directional prediction coded B slice. The slice type is signaled with a slice_type syntax element in the slice header that may have one of the following values in Table 5:

TABLE 5

Name association to slice_type

| slice_type | Name of slice_type |
|---|---|
| 0 | B (B slice) |
| 1 | P (P slice) |
| 2 | I (I slice) |

A picture could consist of slices of different slice types. However, a picture with a certain pic_type value or NAL unit type may be limited to only support I slices or only support I slices and P slices. For instance, a picture with an IRAP NAL unit type or a picture with pic_type equal to 0 in the AUD shall only contain I slices and a picture with pic_type equal to 1 in the AUD may only contain I slices and P slices, whereas a picture with pic_type equal to 2 may contain slices of any slice type, i.e. I slices, P slices or B slices.

The parts of the slice header syntax in the current version of VVC that are relevant to understanding the inventive concepts described herein are illustrated in Table 6.

TABLE 6

Slice header syntax

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   ... | |
|   if( ph_inter_slice_allowed_flag ) | |
|     slice_type | ue(v) |
|   ... | |
| } | |

Parameter Sets

HEVC and VVC specifies three types of parameter sets, the picture parameter set (PPS), the sequence parameter set (SPS), and the video parameter set (VPS). The PPS contains data that is common for a whole picture, the SPS contains data that is common for a coded video sequence (CVS), and the VPS contains data that is common for multiple CVSs, e.g. data for multiple layers in the bitstream.

The current version of VVC also specifies one additional parameter set, the adaptation parameter set (APS). The APS carries parameters needed for an adaptive loop filter (ALF) tool, a luma mapping and chroma scaling (LMCS) tool and a scaling list tool.

Decoding Capability Information (DCI)

DCI specifies information that may not change during the decoding session and that may be useful for the decoder to know about, e.g. the maximum number of allowed sub-layers. The information in DCI is not necessary for operation of the decoding process. In previous drafts of the VVC specification the DCI was called decoding parameter set (DPS). In the description herein, the DCI is defined to be a parameter set.

The decoding capability information also contains a set of general constraints for the bitstream, that gives the decoder information of what to expect from the bitstream, in terms of coding tools, types of NAL units, etc. In the current version of VVC, the general constraint information could also be signaled in VPS or SPS.

Picture Header

In the current version of VVC, a coded picture contains a picture header. The picture header contains syntax elements that are common for all slices of the associated picture. The picture header may be signaled in its own NAL unit with NAL unit type PH_NUT or included in the slice header given that there is only one slice in the coded picture. This is indicated by the slice header syntax element picture_header_in_slice_header_flag, where a value equal to 1 specifies that the picture header is included in the slice header and a value equal to 0 specifies that the picture header is carried in its own NAL unit. For a CVS where not all pictures are single-slice pictures, each coded picture must be preceded by a picture header that is signaled in its own NAL unit. HEVC does not support picture headers.

The parts of the picture header syntax and semantics in the current version of VVC that are relevant to understanding the inventive concepts described herein are shown in Table 7.

TABLE 7

Picture Header Syntax

| | Descriptor |
|---|---|
| picture_header_structure( ) { | |
|   ph_gdr_or_irap_pic_flag | u(1) |
|   ph_non_ref_pic_flag | u(1) |
|   if( ph_gdr_or_irap_pic_flag ) | |
|     ph_gdr_pic_flag | |
|   ... | u(1) |
| } | | ph_gdr_or_irap_pic_flag equal to 1 specifies that the current picture is a GDR or IRAP picture. ph_gdr_or_irap_pic_flag equal to 0 specifies that the current picture is not a GDR picture and may or may not be an IRAP picture.

ph_gdr_pic_flag equal to 1 specifies the picture associated with the PH is a GDR picture. ph_gdr_pic_flag equal to 0 specifies that the picture associated with the PH is not a GDR picture. When not present, the value of ph_gdr_pic_flag is inferred to be equal to 0. When sps_gdr_enabled_flag is equal to 0, the value of ph_gdr_pic_flag shall be equal to 0.

NOTE 1—When ph_gdr_or_irap_pic_flag is equal to 1 and ph_gdr_pic_flag is equal to 0, the picture associated with the PH is an IRAP picture.

Profile, Tier and Levels

A profile in HEVC and VVC is defined as a specified subset of the syntax of the specification.

The current VVC specification comprises the Main 10 profile, the Main 10 Still Picture profile, the Main 4:4:4 10 profile and the Main 4:4:4 10 Still Picture profile where the 10 indicates support of a bitdepth of 10 bits per pixel and 4:4:4 indicates support of 4:4:4 chroma sampled pixels. Main 10 and Main 4:4:4 10 are video profiles while the Main 10 Still Picture and Main 4:4:4 10 Still Picture profiles are still picture profiles. HEVC also comprises these four profiles and in addition a number of range extension profiles and scalable profiles.

HEVC and VVC define a level as a defined set of constraints on the values that may be taken by the syntax elements and variables of the specification. The same set of levels is defined for all profiles, with most aspects of the definition of each level being in common across different profiles. Individual implementations may, within specified constraints, support a different level for each supported profile.

HEVC and VVC define a tier as a specified category of level constraints imposed on values of the syntax elements in the bitstream. The level constraints are nested within a tier and a decoder conforming to a certain tier and level is capable of decoding all bitstreams that conform to the same tier or the lower tier of that level or any level below it.

The Main 10 and Main 10 Still Picture profiles are defined as follows in the current version of VVC:

Main 10 and Main 10 Still Picture Profiles

Bitstreams conforming to the Main 10 or Main 10 Still Picture profile shall obey the following constraints:
In a bitstream conforming to the Main 10 Still Picture profile, the bitstream shall contain only one picture.
Referenced SPSs shall have sps_chroma_format_idc equal to 0 or 1.
Referenced SPSs shall have sps_bitdepth_minus8 in the range of 0 to 2, inclusive.
In a bitstream conforming to the Main 10 Still Picture profile, the referenced SPS shall have max_dec_pic_buffering_minus1[sps_max_sublayers_minus1] equal to 0.
Referenced SPSs shall have sps_palette_enabled_flag equal to 0.
In a bitstream conforming to the Main 10 profile that do not conform to the Main 10 Still Picture profile, general_level_idc and sublayer_level_idc[i] for all values of i in the referenced VPS (when available) and in the referenced SPSs shall not be equal to 255 (which indicates level 15.5).
The tier and level constraints specified for the Main 10 or Main 10 Still Picture profile in clause A.4, as applicable, shall be fulfilled.

Conformance of a bitstream to the Main 10 profile is indicated by general_profile_idc being equal to 1.

Conformance of a bitstream to the Main 10 Still Picture profile is indicated by general_profile_idc being equal to 3.

NOTE—When the conformance of a bitstream to the Main 10 Still Picture profile is indicated as specified above, and the indicated level is not level 15.5, the conditions for indication of the conformance of the bitstream to the Main 10 profile are also fulfilled. Decoders conforming to the Main 10 profile at a specific level of a specific tier shall be capable of decoding all bitstreams for which all of the following conditions apply:
The bitstream is indicated to conform to the Main 10 or Main 10 Still Picture profile.
The bitstream is indicated to conform to a tier that is lower than or equal to the specified tier.
The bitstream is indicated to conform to a level that is not level 15.5 and is lower than or equal to the specified level.

Decoders conforming to the Main 10 Still Picture profile at a specific level of a specific tier shall be capable of decoding all bitstreams for which all of the following conditions apply:
The bitstream is indicated to conform to the Main 10 Still Picture profile.
The bitstream is indicated to conform to a tier that is lower than or equal to the specified tier.
The bitstream is indicated to conform to a level that is not level 15.5 and is lower than or equal to the specified level.

The Main 4:4:4 10 and Main 4:4:4 10 Still Picture profiles in VVC are specified in a similar way as the Main 10 and Main 10 Still Picture profiles with the exception that sps_chroma_format_idc may be in the range from 0 to 3.

SUMMARY

A problem with the current version of the VVC specification is that a decoder conforming to the Main 10 Still Picture profile, but not the Main 10 profile would not be able to decode an extracted IRAP picture from a Main 10 video bitstream unless the general_profile_idc in SPS of the extracted bitstream is first rewritten. Having to rewrite a bitstream in order to support this functionality is undesirable.

Another problem with the current version of the VVC specification is that even if the general_profile_idc is rewritten to the Main 10 Still Picture profile for a video bitstream comprising more than one pictures, the bitstream would not be a legal bitstream since the Main 10 Still Picture profile requires there to be only one picture in the bitstream. In order to decode the first picture in the bitstream all remaining pictures would need to be discarded from the bitstream to make it a one picture bitstream before decoding the bitstream.

According to some embodiments of inventive concepts, a method for determining that a decoder conforming to a first profile is capable of decoding a first picture of a video bitstream conforming to a second profile includes obtaining an indicator value, the indicator value indicating conformance to a profile. The method includes determining whether the first picture in the video bitstream is a still picture. The method includes responsive to the indicator value indicating conformance to the second profile and the first picture is determined to be a still picture, determining that the decoder conforming to the first profile is capable of decoding the first picture of the video bitstream.

An advantage that may be achieved is that a Main 10 bitstream does not need to be rewritten for a Main 10 Still Picture decoder to be able to decode one picture from the Main 10 bitstream.

Another advantage with some versions of inventive concepts is that a program that wants to decode the first picture of a video bitstream does not have to first strip off the rest of the pictures before sending the bit stream to a compliant still picture decoder.

According to other embodiments of inventive concepts, decoders, computer programs, and computer program products are provided that include analogous operations of the above embodiments of inventive concepts.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 6-13 are flow charts illustrating operations of a decoder according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Various embodiments of inventive concepts provide a method for determining that a video bitstream conforms to a profile A (e.g. a still picture profile) if an indicator value (e.g. decoded from a syntax element in a parameter set in the bitstream) indicates that the bitstream conforms to a profile B (e.g. a video profile) and it is determined that the first picture of the bitstream is a still picture (e.g. an IRAP picture).

In one embodiment of inventive concepts, a determination is made that the first picture is an IRAP picture by determining that the NAL unit type of all VCL NAL units in the first picture are IRAP NAL unit types.

In another embodiment of inventive concepts, a determination is made that the first picture is an IRAP picture from a value decoded from a syntax element in a picture header or an access unit delimiter.

Figure 2:
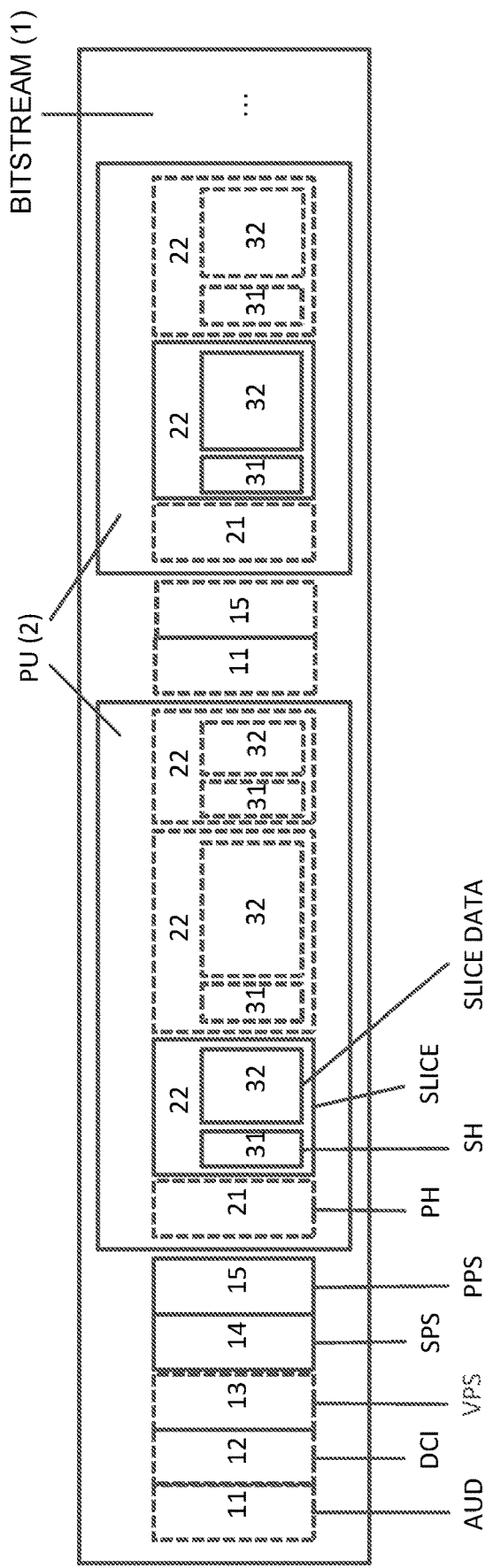
FIG. 2 is a block diagram illustrating a bitstream and terminology used in describing various embodiments of inventive concepts.

The terminology used to describe the inventive concepts is further illustrated in FIG. 2. A dashed line in FIG. 2 indicates that the box is optional in VVC. A bitstream 1 carries one or more coded pictures. The set of NAL units associated with a coded picture is in the current version of VVC and is referred to as a picture unit (PU) 2. A VVC bitstream may start with decoding capability information, (DCI) 12 followed by a video parameter set (VPS) 13, sequence parameter set (SPS) 14, and picture parameter set (PPS) 15 in the beginning of each coded video sequence (CVS). A PPS 14 may also be signaled before any coded picture. A PU 2 must comprise at least one coded slice 22, comprising a slice header (SH) 31 and slice data 32. A PU 2 must include one picture header (PH) 21. In the current version of VVC, the PH 21 may be signaled in its own NAL unit or in the same NAL unit as a slice 22, more specifically in the SH 31. An access unit delimiter (AUD) 11, may be signaled as the first NAL unit in an access unit.

Although the inventive concepts shall mainly be described by terms used in VVC, it is to be understood by a person skilled in the art that the inventive concepts may also be applicable to other current and future video codecs.

A "still picture" is defined as a single static picture. A coded still picture is always intra coded, i.e. not predicting from any other picture than itself. This means that all blocks in the picture are Intra coded blocks and there is no data in the coded still picture that uses prediction from any other picture. A still picture may be extracted from a set of moving pictures, i.e. extracted from video.

A predicting or predictive picture is defined as a coded picture that predicts from another picture than itself.

The term "external means" is defined as information that is not provided in the bitstream but by some other means, e.g. via metadata possibly provided in a different data channel, as a constant in the decoder, etc. Both HEVC and VVC allows certain information (e.g. parameter sets) to be provided by external means.

Figure 3:
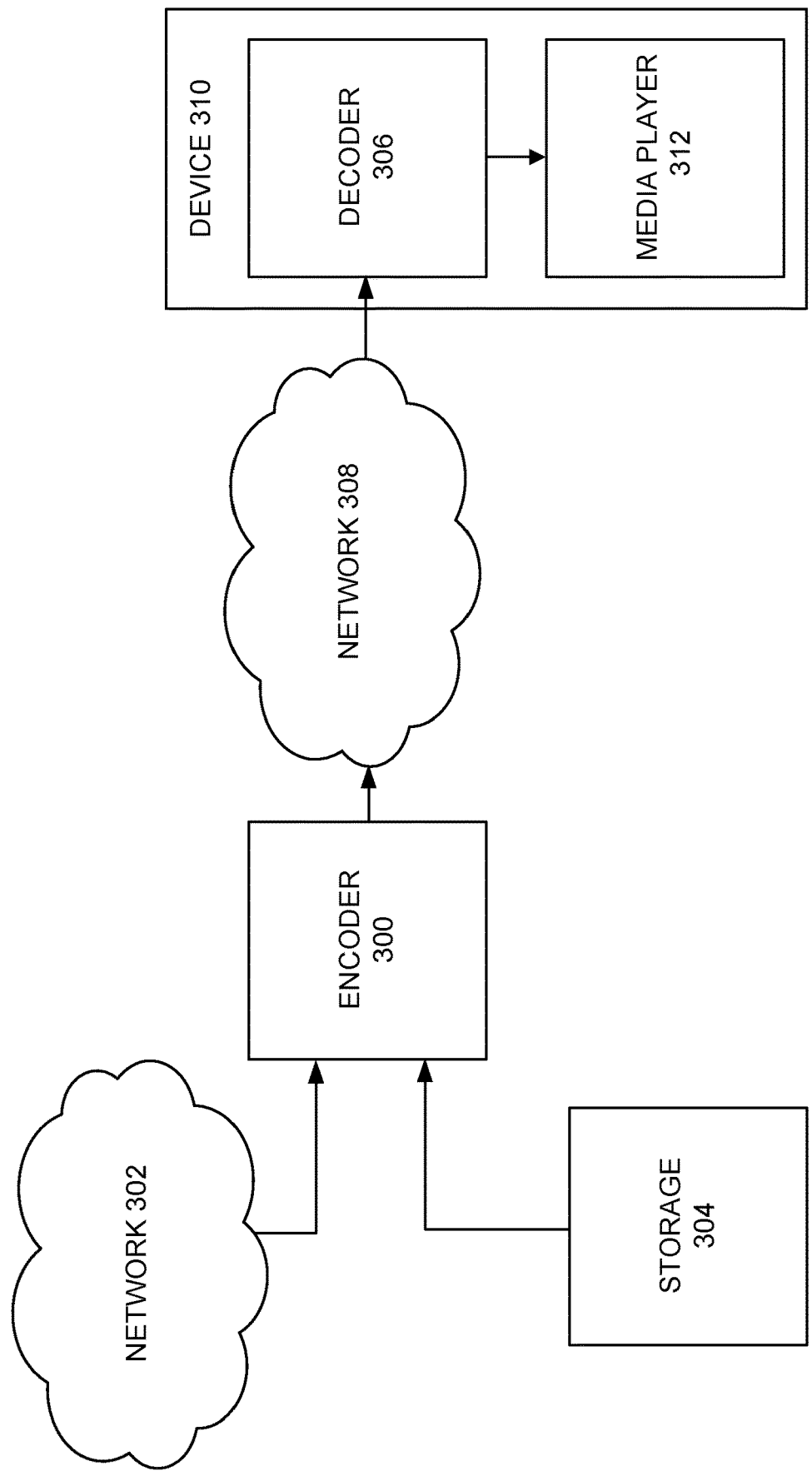
FIG. 3 is a block diagram illustrating an example of an environment of a system in which the encoder and decoder may be implemented according to some embodiments of inventive concepts.

Prior to describing the embodiments in further detail, FIG. 3 illustrates an example of an operating environment of an encoder 300 and decoder 306 that may be used to respectively encode and decode bitstreams as described herein. The encoder 300 receives video from network 302 and/or from storage 304 and encodes the video into bitstreams as described below and transmits the encoded video to decoder 306 via network 308. Storage device 304 may be part of a storage depository of multi-channel audio signals such as a storage repository of a store or a streaming video service, a separate storage component, a component of a mobile device, etc. The decoder 306 may be part of a device 310 having a media player 312. The device 310 may be a mobile device, a set-top device, a desktop computer, and the like.

Figure 1:
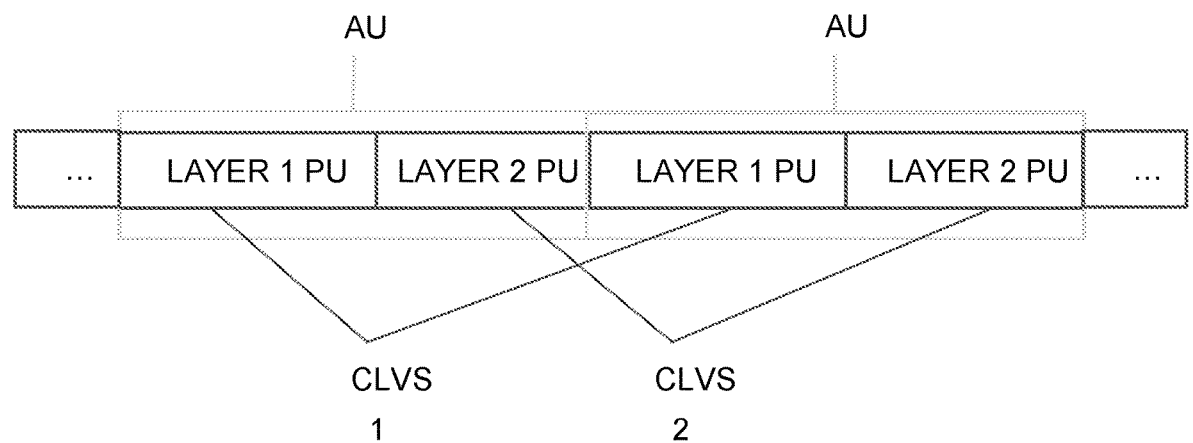
FIG. 1 is a diagram illustrating the relation between picture units (PUs), access units (AUs), and coded layer sequences (CLVSs)
Figure 4:
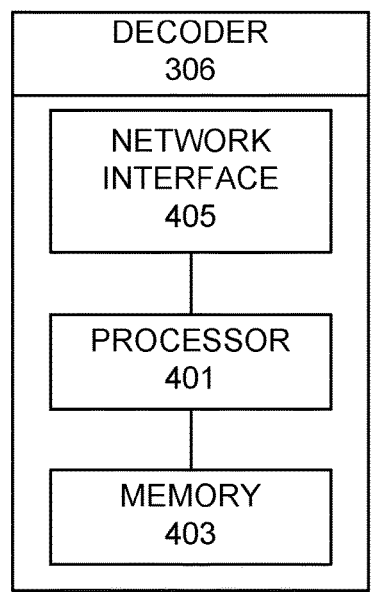
FIG. 4 is a block diagram illustrating a decoder according to some embodiments.

FIG. 4 is a block diagram illustrating elements of decoder 306 configured to decode video frames according to some embodiments of inventive concepts. As shown, decoder 306 may include a network interface circuit 405 (also referred to as a network interface) configured to provide communications with other devices/entities/functions/etc. The decoder 306 may also include a processor circuit 401 (also referred to as a processor) coupled to the network interface circuit 405, and a memory circuit 403 (also referred to as memory) coupled to the processor circuit. The memory circuit 403 may include computer readable program code that when executed by the processor circuit 401 causes the processor circuit to perform operations according to embodiments disclosed herein.

According to other embodiments, processor circuit 401 may be defined to include memory so that a separate memory circuit is not required. As discussed herein, operations of the decoder 306 may be performed by processor 401 and/or network interface 405. For example, processor 401 may control network interface 405 to receive communications from encoder 300. Moreover, modules may be stored in memory 403, and these modules may provide instructions so that when instructions of a module are executed by processor 401, processor 401 performs respective operations and/or causes the decoder 306 or other nodes/functions to perform respective operations. According to some embodiments, a decoder 306 and/or an element(s)/function(s) thereof may be embodied as a virtual node/nodes and/or a virtual machine/machines.

Figure 5:
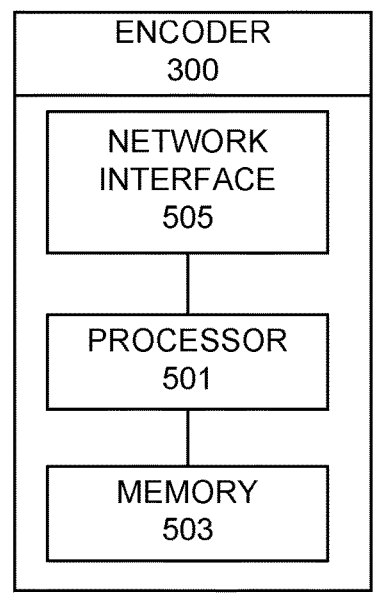
FIG. 5 is a block diagram illustrating an encoder according to some embodiments.

FIG. 5 is a block diagram illustrating elements of encoder 300 configured to encode video frames according to some embodiments of inventive concepts. As shown, encoder 300 may include a network interface circuit 505 (also referred to as a network interface) configured to provide communications with other devices/entities/functions/etc. The encoder 300 may also include a processor circuit 501 (also referred to as a processor) coupled to the network interface circuit 505, and a memory circuit 503 (also referred to as memory) coupled to the processor circuit. The memory circuit 503 may include computer readable program code that when executed by the processor circuit 501 causes the processor circuit to perform operations according to embodiments disclosed herein.

According to other embodiments, processor circuit 501 may be defined to include memory so that a separate memory circuit is not required. As discussed herein, operations of the encoder 300 may be performed by processor 501 and/or network interface 505. For example, processor 501 may control network interface 505 to transmit communications to decoder 306 and/or to receive communications through network interface 505 from one or more other network nodes/entities/servers such as other encoder nodes, depository servers, etc. Moreover, modules may be stored in memory 503, and these modules may provide instructions so that when instructions of a module are executed by processor 501, processor 501 performs respective operations. According to some embodiments, an encoder 300 and/or an element(s)/function(s) thereof may be embodied as a virtual node/nodes and/or a virtual machine/machines.

As previously indicated a problem with the current VVC specification is that a decoder conforming to the Main 10 Still Picture profile, but not the Main 10 profile would not be able to decode an extracted IRAP picture from a Main 10 video bitstream unless the general_profile_idc in SPS of the extracted bitstream is first rewritten. Having to rewrite a bitstream in order to support this functionality is undesirable.

Another problem with the current VVC specification is that even if the general_profile_idc is rewritten to the Main 10 Still Picture profile for a video bitstream comprising more than one picture, the bitstream would not be a legal bitstream since the Main 10 Still Picture profile requires there to be only one picture in the bitstream. In order to decode the first picture in the bitstream all remaining pictures would need to be discarded from the bitstream to make it a one picture bitstream before decoding the bitstream.

In the description that follows, the terminology profile A, profile B, and profile C will be used to differentiate between various profiles that are present in a bitstream such as a video bitstream.

In a first embodiment of inventive concepts, a video bitstream is determined to conform to a profile A (e.g. a still picture profile) if an indicator value (e.g. encoded in a syntax element in a parameter set in the bitstream or provided by external means) indicates that the bitstream conforms to a profile B (e.g. a video profile) and it is determined that the first picture of the bitstream is a still picture (e.g. an IRAP picture)

An encoder may perform a subset or all of the following steps for indicating that a video bitstream conforms to a profile A (where profile A may be a still picture profile):
1. Encode an indicator value in a syntax element in the bitstream (e.g. in a parameter set) where the indicator value indicates conformance to profile A or profile B (e.g. a video profile). The syntax elment may for instance be general_profile_idc.
2. Encode a still picture to the bitstream, and signal in the still picture that it is a still picture (e.g. by setting the NAL unit type of all VCL NAL units of the still picture to an IRAP NAL unit type or by signal one or more values in the picture header or AUD that indicates that the picture is an IRAP picture)

An extractor may perform a subset or all of the following steps for extracting a picture from a video bitstream conforming to a profile B to conform to a profile of A:
1. Extract a parameter set from the bitstream.
2. Decode an indicator value from a syntax element in the bitstream (e.g. from the parameter set) where the indicator value indicates conformance to a specific profile. The syntax element may for instance be general_profile_idc.
3. Determine that the indicator value indicates bitstream conformance to profile A or profile B.
4. Extract a still picture (e.g. an TRAP picture) that is associated with the parameter set (if the parameter set is extracted) from the bitstream.
5. Combine the extracted parameter set and the extracted still picture to form a still picture bitstream A decoder may perform a subset or all of the following steps for determining whether a video bitstream conforms to a profile A (where profile A may be a still picture profile):
1. Obtain an indicator value where the indicator value indicates conformance to a specific profile. The indicator value may be decoded from a syntax element in the bitstream (e.g. from a parameter set) or be provided by external means. The syntax element may for instance be general_profile_idc.
2. Determine from a first picture in the bitstream whether the first picture is a still picture
3. In response to the indicator value indicating a profile B (where profile B may be a video profile) and the first picture determined to be a still picture:
    a. determine that the bitstream conforms to profile A
    b. decode the bitstream using a decoder conforming to profile A
4. In response to the indicator value indicating a profile C (where profile C is a profile different from profile A and B) or the first picture is not a still picture (i.e. it is a predicting picture):
    a. determine that the bitstream does not conform to profile A.

In the above steps that the decoder may perform, "still picture" is meant to refer to an image or picture that does not depend on (e.g. predict from) any other picture, such as an IRAP picture.

The above steps are not necessarily in order and some steps may be omitted. For instance a decoder may choose to first check whether the indicator value indicates conformance to profile B. If the bitstream conforms to profile B, then the decoder also checks whether the first picture is a still picture before determining whether the bitstream conforms to profile A. Otherwise (if the bitstream does not conform to profile B), the decoder skips the step of checking whether the first picture is a still picture and directly determines that the bitstream does not conform to profile A.

In one version of the first embodiment, the still picture is an IRAP picture, i.e. the determining from the first picture in the bitstream whether the first picture is a still picture comprises determining whether the first picture is an IRAP picture.

In another version of the embodiment, the still picture may be any type of picture that does not predict from other pictures. An example of such a picture is a GDR picture which is instantly refreshed, i.e. the recovery POC count is equal to 0. A more general example of such a picture is a picture with a picture type indicating that it is a predictive picture, but the picture is fully intra coded.

In another version of this first embodiment, the determining that the bitstream conforms to profile A additionally comprises verifying that the first picture is the only picture of the bitstream. A decoder may check whether the picture is the only picture in the bitstream by:
  Obtaining an indicator value indicating from the bitstream (e.g. from a parameter set, picture header or slice header) whether the picture is the only picture in the bitstream.
  Obtaining the information that the picture is the only picture in the bitstream by external means.
  Parsing the bitstream to detect whether the bitstream comprises more than one picture (e.g. by identifying a NAL unit with POC different than the first picture or identifying an AUD which belongs to a second picture) or if the first picture is the only picture in the bitstream (e.g. by obtaining a NAL unit with NAL unit type EOB_NUT directly after the first picture or parse to the end of the bitstream without identifying another picture than the first picture)

In another version of this first embodiment, a decoder conforming to a still picture profile A and not profile B would be able to decode the first picture (but not the rest) of a profile B video bitstream that comprises more than one picture.

In yet another variation of this first embodiment, the following steps are performed to determine that a video bitstream conforms to a still picture profile A:
  1. Obtain an indicator value where the indicator value indicates conformance to a video profile B that is not the still picture profile A.
  2. Determine that the first picture in the video bitstream is a still picture. In one version this comprises determining that the first picture is an IRAP picture.
  3. In response to the indicator value indicating conformance to a video profile B that is not a still picture profile and the first picture in the video bitstream determined to be a still picture, determine that the bitstream conforms to the still picture profile A.

In a second embodiment according to the first embodiment, the determining whether the first picture is an IRAP picture is done by checking the NAL unit type of each VCL NAL unit in the first picture. This may be done by scanning the first picture of the bitstream for NAL unit headers and determine that each NAL unit type has a value corresponding to an IRAP type. In VVC the IRAP NAL unit types are IDR_W_RADL, IDR_N_LP and CRA_NUT.

An example of how the definition of the Main 10 and Main 10 Still Picture profiles in the current VVC specification could be changed according to this embodiment is shown below with added text italicized and in bold:
  Main 10 and Main 10 Still Picture profiles
  Bitstreams conforming to the Main 10 or Main 10 Still Picture profile shall obey the following constraints:
  Decoders conforming to the Main 10 Still Picture profile at a specific level of a specific tier shall be capable of decoding all bitstreams for which all of the following conditions apply:
    The bitstream is indicated to conform to the Main 10 Still Picture profile or the bitstream is indicated to conform to the Main 10 profile and the bitstream contains only one picture and the nal_unit_type of all VCL NAL units are in the range of IDR_W_RADL to CRA_NUT, inclusive.
    The bitstream is indicated to conform to a tier that is lower than or equal to the specified tier.
    The bitstream is indicated to conform to a level that is not level 15.5 and is lower than or equal to the specified level.

Another example of how the definition of the Main 10 and Main 10 Still Picture profiles in the current VVC specification could be changed according to this embodiment is shown below with added text italicized and in bold. In this example the Main 10 Still Picture profile would in addition to the previous example support decoding the first IRAP picture of a video bitstream comprising more than one pictures:
  Main 10 and Main 10 Still Picture profiles
  Bitstreams conforming to the Main 10 or Main 10 Still Picture profile shall obey the following constraints:
  Decoders conforming to the Main 10 Still Picture profile at a specific level of a specific tier shall be capable of decoding the first picture of all bitstreams for which all of the following conditions apply:
    The bitstream is indicated to conform to the Main 10 Still Picture profile or the bitstream is indicated to conform to the Main 10 profile and the nal_unit_type of all VCL NAL units for the first picture of the bitstream are in the range of IDR_W_RADL to CRA_NUT, inclusive.
    The bitstream is indicated to conform to a tier that is lower than or equal to the specified tier.
    The bitstream is indicated to conform to a level that is not level 15.5 and is lower than or equal to the specified level.

Other examples of how the definition of the Main 10, Main 10 Still Picture, Main 4:4:4 10 and Main 4:4:4 10 Still picture profiles in the current VVC specification could be changed are in a proposal being provided to the Joint Video Experts Team (JVET) of ITU-T SG 16 WP 3 and ISO/IEC JTC 1/SC 29/WG 11-19th Meeting: by teleconference, 22 Jun.-1 Jul. 2020.

According to this proposal, a bitstream containing a single IRAP picture and conforming to the Main 10 profile, also conforms to the Main 10 Still Picture profile. Likewise, a bitstream containing a single IRAP picture and conforming to the Main 4:4:4 10 profile, also conforms to the Main 4:4:4 10 Still Picture profile. Further details on this proposal are described in the following paragraphs.

In a third embodiment of inventive concepts, the determining whether the first picture is a still picture is determined from one or more values decoded from one or more syntax elements in a picture header (or slice header) of the first picture in the bitstream.

An example of how the definition of Main 4:4:4 10 and Main 4:4:4 10 Still Picture profiles could be changed is shown below with added text italicized and in bold: Bitstreams conforming to the Main 4:4:4 10 or Main 4:4:4 10 Still Picture profile shall obey the following constraints:

Decoders conforming to the Main 4:4:4 10 Still Picture profile at a specific level of a specific tier shall be capable of decoding all bitstreams for which all of the following conditions apply:

The bitstream is indicated to
conform to the Main 4:4:4 10 Still Picture or the Main 10 Still Picture profile; or
conform to the Main 10 profile and the bitstream contains only one picture and nal_unit_type of all VCL NAL units are in the range of IDR_W_RADL to CRA_NUT, inclusive; or
conform to the Main 4:4:4 10 profile and the bitstream contains only one picture and nal_unit_type of all VCL NAL units are in the range of IDR_W_RADL to CRA_NUT, inclusive.

The bitstream is indicated to conform to a tier that is lower than or equal to the specified tier.

The bitstream is indicated to conform to a level that is not level 15.5 and is lower than or equal to the specified level.

An example of how the definition of the Main 10 and Main 10 Still Picture profiles in the current VVC specification could be changed according to this embodiment is shown below with added text italicized and in bold:

Main 10 and Main 10 Still Picture profiles
Bitstreams conforming to the Main 10 or Main 10 Still Picture profile shall obey the following constraints:
Decoders conforming to the Main 10 Still Picture profile at a specific level of a specific tier shall be capable of decoding all bitstreams for which all of the following conditions apply:
The bitstream is indicated to conform to the Main 10 Still Picture profile or the bitstream is indicated to conform to the Main 10 profile and the bitstream contains only one picture and the ph_gdr_or_irap_pic_flag is equal to 1 and ph_gdr_pic_flag is equal to 0.
The bitstream is indicated to conform to a tier that is lower than or equal to the specified tier.
The bitstream is indicated to conform to a level that is not level 15.5 and is lower than or equal to the specified level.

Other examples of how the definition of the Main 10, Main 10 Still Picture, Main 4:4:4 10 and Main 4:4:4 10 Still picture profiles in the current VVC specification could be changed are in a proposal being provided to the Joint Video Experts Team (JVET) of ITU-T SG 16 WP 3 and ISO/IEC JTC 1/SC 29/WG 11-19th Meeting: by teleconference, 22 Jun.-1 Jul. 2020, details of which are below.

In another example, the picture header comprises a new flag that only indicates whether the picture is an IRAP picture or not. The flag may for instance be called ph_irap_pic_flag and the definition of the Main 10 and Main 10 Still Picture profiles in the current VVC specification could be changed as shown below with added text italicized and in bold:

Main 10 and Main 10 Still Picture profiles
Bitstreams conforming to the Main 10 or Main 10 Still Picture profile shall obey the following constraints:
Decoders conforming to the Main 10 Still Picture profile at a specific level of a specific tier shall be capable of decoding all bitstreams for which all of the following conditions apply:
The bitstream is indicated to conform to the Main 10 Still Picture profile or the bitstream is indicated to conform to the Main 10 profile and the bitstream contains only one picture and the ph_irap_pic_flag_is equal to 1.
The bitstream is indicated to conform to a tier that is lower than or equal to the specified tier.
The bitstream is indicated to conform to a level that is not level 15.5 and is lower than or equal to the specified level.

Main 4:4:4 10 and Main 4:4:4 10 Still Picture profiles
Bitstreams conforming to the Main 4:4:4 10 or Main 4:4:4 10 Still Picture profile shall obey the following constraints:
Decoders conforming to the Main 4:4:4 10 Still Picture profile at a specific level of a specific tier shall be capable of decoding all bitstreams for which all of the following conditions apply:
The bitstream is indicated to
conform to the Main 4:4:4 10 Still Picture or the Main 10 Still Picture profile; or
conform to the Main 10 profile and the bitstream contains only one picture and ph_gdr_or_irap_pic_flag is equal to 1 and ph_gdr_pic_flag is equal to 0; or
conform to the Main 4:4:4 10 profile and the bitstream contains only one picture and ph_gdr_or_irap_pic_flag is equal to 1 and ph_gdr_pic_flag is equal to 0.
The bitstream is indicated to conform to a tier that is lower than or equal to the specified tier.
The bitstream is indicated to conform to a level that is not level 15.5 and is lower than or equal to the specified level.

Current Profile Definitions in VVC
The profiles in VVC are defined as follows in JVET-S0152-v5.

Main 10 and Main 10 Still Picture Profiles
Bitstreams conforming to the Main 10 or Main 10 Still Picture profile shall obey the following constraints:
In a bitstream conforming to the Main 10 Still Picture profile, the bitstream shall contain only one picture.
Referenced SPSs shall have sps_chroma_format_idc equal to 0 or 1.
Referenced SPSs shall have sps_bitdepth_minus8 in the range of 0 to 2, inclusive.
In a bitstream conforming to the Main 10 Still Picture profile, the referenced SPS shall have max_dec_pic_buffering_minus1[sps_max_sublayers_minus1] equal to 0. [Ed. (YK): Maybe it's better not to have this constraint for the Main 10 Still Picture profile, such that when extracting an intra picture from a Main 10 bitstream to form a Main 10 Still Picture bitstream, the extractor/"encoder" does not have to change the value of max_dec_pic_buffering_minus1[ ] in the SPS.]
Referenced SPSs shall have sps_palette_enabled_flag equal to 0.
In a bitstream conforming to the Main 10 profile that do not conform to the Main 10 Still Picture profile, general_level_idc and sublayer_level_idc[i] for all values of i in the referenced VPS (when available) and in the referenced SPSs shall not be equal to 255 (which indicates level 15.5).
The tier and level constraints specified for the Main 10 or Main 10 Still Picture profile in clause A.4, as applicable, shall be fulfilled.

Conformance of a bitstream to the Main 10 profile is indicated by general_profile_idc being equal to 1.

Conformance of a bitstream to the Main 10 Still Picture profile is indicated by general_profile_idc being equal to 3.

NOTE—When the conformance of a bitstream to the Main 10 Still Picture profile is indicated as specified above, and the indicated level is not level 15.5, the conditions for indication of the conformance of the bitstream to the Main 10 profile are also fulfilled.

Decoders conforming to the Main 10 profile at a specific level of a specific tier shall be capable of decoding all bitstreams for which all of the following conditions apply:

The bitstream is indicated to conform to the Main 10 or Main 10 Still Picture profile.

The bitstream is indicated to conform to a tier that is lower than or equal to the specified tier.

The bitstream is indicated to conform to a level that is not level 15.5 and is lower than or equal to the specified level.

Decoders conforming to the Main 10 Still Picture profile at a specific level of a specific tier shall be capable of decoding all bitstreams for which all of the following conditions apply:

The bitstream is indicated to conform to the Main 10 Still Picture profile.

The bitstream is indicated to conform to a tier that is lower than or equal to the specified tier.

The bitstream is indicated to conform to a level that is not level 15.5 and is lower than or equal to the specified level.

Main 4:4:4 10 and Main 4:4:4 10 Still Picture Profiles

Bitstreams conforming to the Main 4:4:4 10 or Main 4:4:4 10 Still Picture profile shall obey the following constraints:

In a bitstream conforming to the Main 4:4:4 10 Still Picture profile, the bitstream shall contain only one picture.

Referenced SPSs shall have sps_chroma_format_idc in the range of 0 to 3, inclusive.

Referenced SPSs shall have sps_bitdepth_minus8 in the range of 0 to 2, inclusive.

In a bitstream conforming to the Main 4:4:4 10 Still Picture profile, the referenced SPS shall have max_dec_pic_buffering_minus1[sps_max_sublayers_minus1] equal to 0. [Ed. (YK): Maybe it's better not to have this constraint for the Main 4:4:4 10 Still Picture profile, such that when extracting an intra picture from a Main 4:4:4 10 bitstream to form a Main 4:4:4 10 Still Picture bitstream, the extractor/"encoder" does not have to change the value of max_dec_pic_buffering_minus1[ ] in the SPS.]

In a bitstream conforming to the Main 4:4:4 10 profile that do not conform to the Main 4:4:4 10 Still Picture profile, general_level_idc and sublayer_level_idc[i] for all values of i in the referenced VPS (when available) and in the referenced SPSs shall not be equal to 255 (which indicates level 15.5).

The tier and level constraints specified for the Main 4:4:4 10 or Main 4:4:4 10 Still Picture profile in clause A.4, as applicable, shall be fulfilled.

Conformance of a bitstream to the Main 4:4:4 10 profile is indicated by general_profile_idc being equal to 2.

Conformance of a bitstream to the Main 4:4:4 10 Still Picture profile is indicated by general_profile_idc being equal to 4.

NOTE—When the conformance of a bitstream to the Main 10 4:4:4 Still Picture profile is indicated as specified above, and the indicated level is not level 15.5, the conditions for indication of the conformance of the bitstream to the Main 10 4:4:4 profile are also fulfilled.

Decoders conforming to the Main 4:4:4 10 profile at a specific level of a specific tier shall be capable of decoding all bitstreams for which all of the following conditions apply:

The bitstream is indicated to conform to the Main 4:4:4 10, Main 10, Main 4:4:4 10 Still Picture, or Main 10 Still Picture profile.

The bitstream is indicated to conform to a tier that is lower than or equal to the specified tier.

The bitstream is indicated to conform to a level that is not level 15.5 and is lower than or equal to the specified level.

Decoders conforming to the Main 4:4:4 10 Still Picture profile at a specific level of a specific tier shall be capable of decoding all bitstreams for which all of the following conditions apply:

The bitstream is indicated to conform to the Main 4:4:4 10 Still Picture or Main 10 Still Picture profile.

The bitstream is indicated to conform to a tier that is lower than or equal to the specified tier.

The bitstream is indicated to conform to a level that is not level 15.5 and is lower than or equal to the specified level.

In an alternative embodiment of inventive concepts, the determining whether the first picture is a still picture is determined from a value decoded from a syntax element in an access unit delimiter (AUD) of the access unit of the first picture. The syntax element could for instance be a flag (e.g., aud_irap_or_gdr_au_flag) which specifies whether or not the access unit comprises a still picture such as an IRAP or GDR access unit. In another version, the syntax element in the AUD only specifies whether or not the picture is an IRAP picture or not.

Operations of the decoder 306 (implemented using the structure of the block diagram of FIG. 4) will now be discussed with reference to the flow charts of FIGS. 6-13 according to some embodiments of inventive concepts. For example, modules may be stored in memory 403 of FIG. 4, and these modules may provide instructions so that when the instructions of a module are executed by respective communication device processing circuitry 401, processing circuitry 401 performs respective operations of the flow charts.

Figure 6:
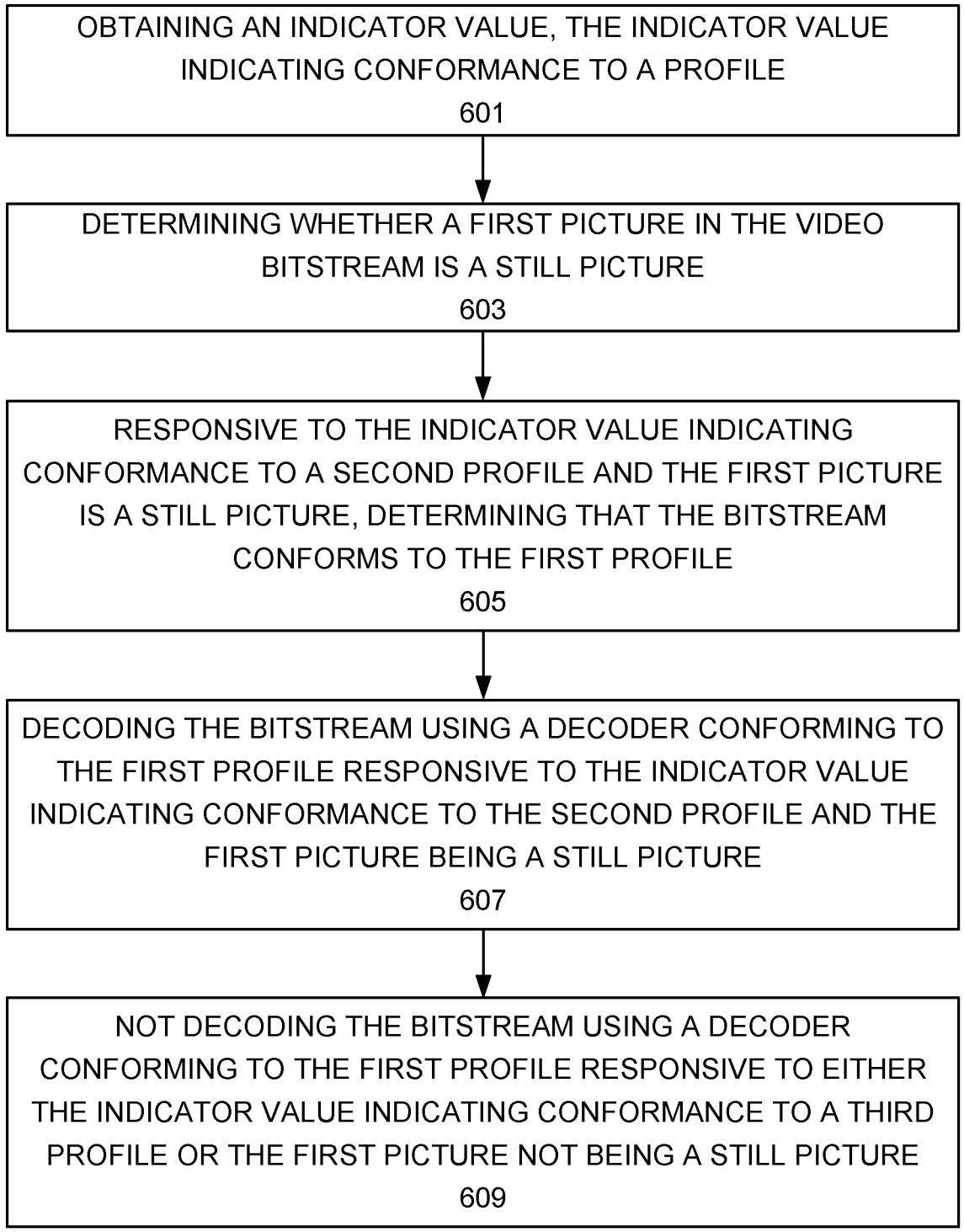

Turning to FIG. 6, in block 601, the processing circuitry 401 in block 601 obtains an indicator value, the indicator value indicating conformance to a profile. For example, the indicator value may indicate the video bitstream conforms to a first profile, a second profile, or a third profile.

Figure 8:
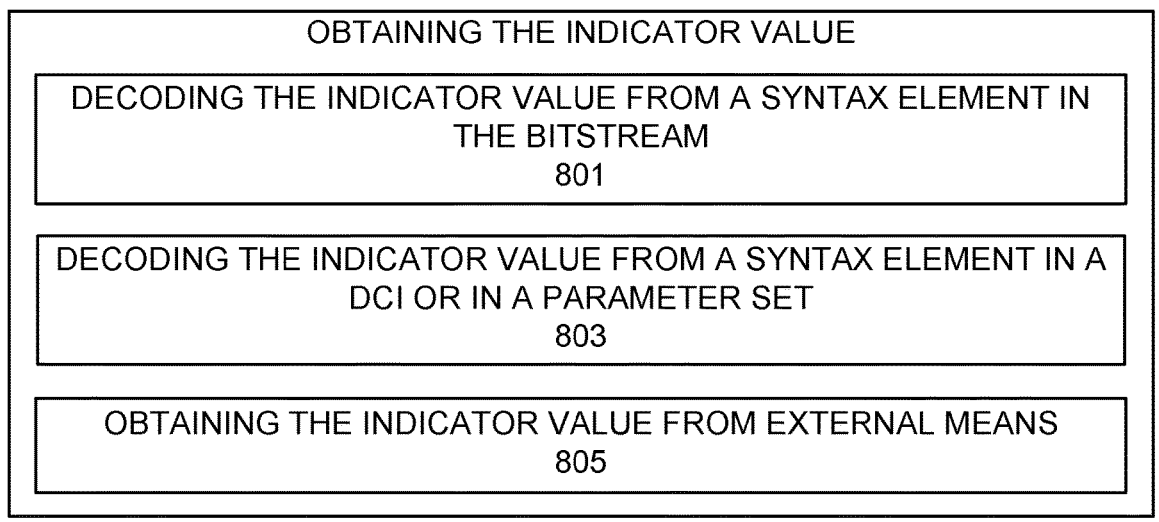

Turning to FIG. 8, in one embodiment of inventive concepts, in block 801, the processing circuitry 401 can obtain the indicator value from a syntax element in the bitstream.

In another embodiment of inventive concepts, the processing circuitry 401 in block 803 can obtain the indicator value from a syntax element in a decoding capability information (DCI) or in a parameter set. The parameter set may be one of a video parameter set (VPS), a sequence parameter set (SPS), or a picture parameter set (PPS), etc.

In yet another embodiment of inventive concepts, the processing circuitry 401 in block 805 can obtain the indicator value from external means. The external means may be metadata provided in a different data channel than the video bitstream, as a constant in the decoder, etc.

Returning to FIG. 6, in block 603, the processing circuitry 401 determines whether a first picture in the video bitstream is a still picture. In one embodiment of inventive concepts, the processing circuitry 401 can determine whether the first picture in the video bitstream is a still picture by determining whether the first picture is an intra random access point (IRAP) picture. Alternatively, the processing circuitry 401 can determine whether the first picture in the video bitstream is a still picture by obtaining one or more values from syntax elements, wherein the values from syntax elements specifies whether the first picture in the video bitstream is a still picture. The syntax elements may be present in the video bitstream. In another example, the syntax elements are not present in the video bitstream but are obtained from external means, such as from a different data channel than the video bitstream.

Figure 9:
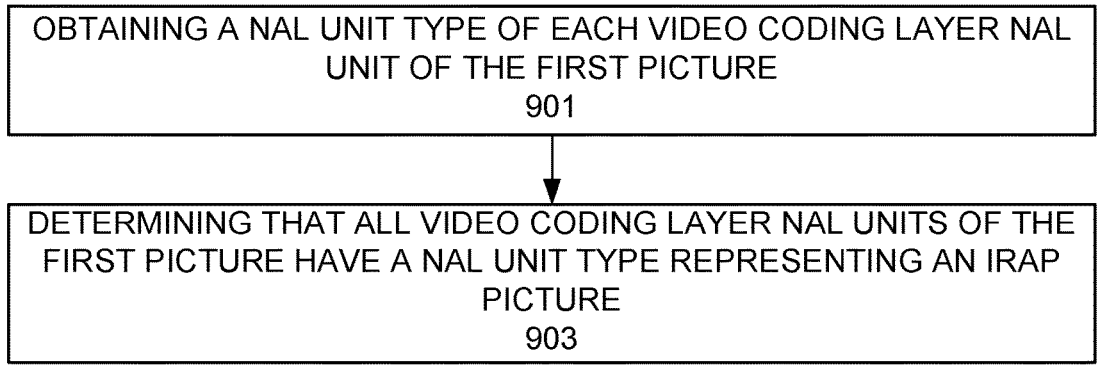

Turning to FIG. 9, in another embodiment of inventive concepts, the processing circuitry 401 can determine whether the first picture is a still picture by determining that the first picture is a still picture by: obtaining in block 901 a network abstraction layer, NAL, unit type of each video coding layer NAL unit of the first picture, and determining in block 903 that all video coding layer NAL units of the first picture have a NAL unit type representing an intra random access point, IRAP, picture.

Figure 10:
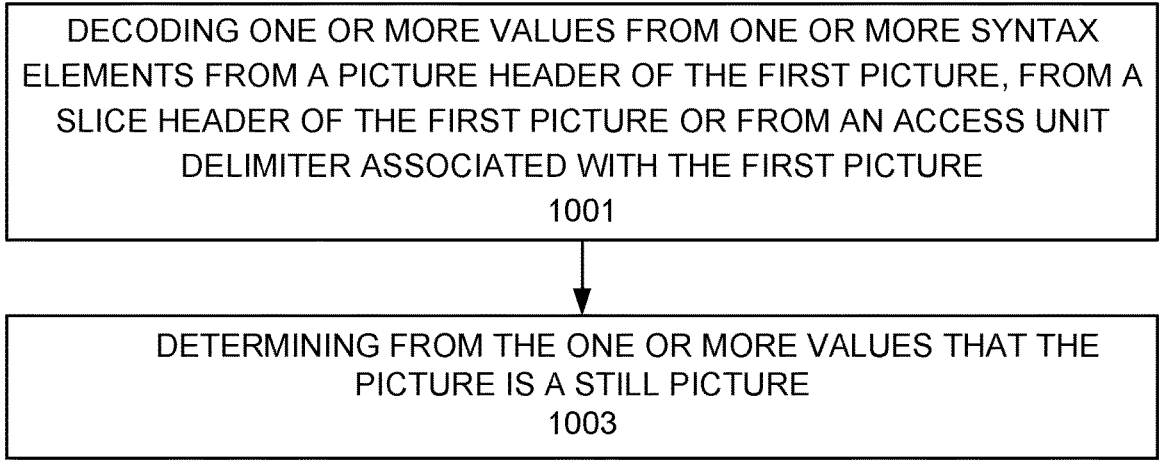

Turning to FIG. 10, in another embodiment of inventive concepts, the processing circuitry 401 can determine whether the first picture is a still picture by determining that the first picture is a still picture by: decoding one or more values from one or more syntax elements from a picture header of the first picture, from a slice header of the first picture in block 1001, or from an access unit delimiter (AUD) associated with the first picture and determining from the one or more values whether the picture is a still picture in block 1003. The values may be decoded from the picture header only, or from the slice header only, or from a combination of syntax elements from both the picture header and from the slice header.

In a further embodiment of inventive concepts, the processing circuitry 401 can determine whether the first picture is a still picture by determining whether the first picture is a gradual decoding refresh (GDR) picture with a recovery picture order count (POC) count equal to 0.

In yet other embodiments of inventive concepts, the processing circuitry 401 can determine whether the first picture is a still picture obtaining one or more values from syntax elements, wherein the values from syntax elements specifies whether the first picture in the video bitstream is a still picture.

Figure 7:
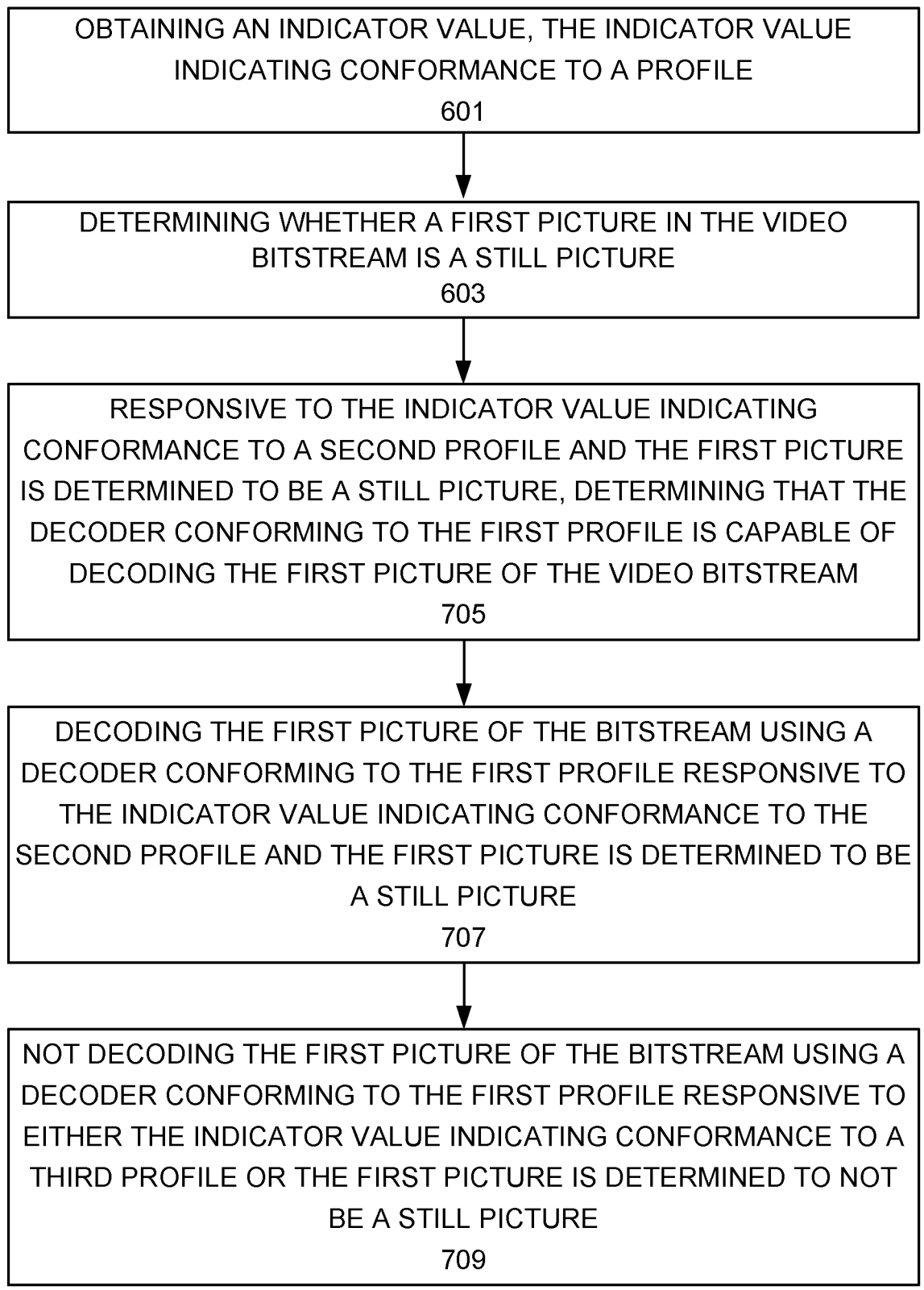

Returning to FIG. 6, in block 605, the processing circuitry 401, responsive to the indicator value indicating conformance to a second profile and the first picture is a still picture, determines that the bitstream conforms to the first profile. In other embodiments as illustrated in FIG. 7, in block 705, the processing circuitry 401, responsive to the indicator value indicating conformance to the second profile and the first picture is determined to be a still picture, determines that the decoder conforming to the first profile is capable of decoding the first picture of the video bitstream. In other words, the decoder would be able to decode the first picture of the video bitstream. The first profile may be a still picture profile. The second profile may be a video profile and/or be different than the first profile.

In block 607, the processing circuitry 401 can decode the bitstream using a decoder conforming to the first profile responsive to the indicator value indicating conformance to the second profile and the first picture being a still picture. As indicated above, in some embodiments as illustrated in FIG. 7, the processing circuitry 401 in block 707 can decode the first picture of the bitstream using a decoder conforming to the first profile responsive to the indicator value indicating conformance to the second profile and the first picture is determined to be a still picture. In these embodiments, the processing circuitry 401 may or may not be able to decode other parts of the bitstream.

In block 609, the processing circuitry 401 does not decode the bitstream using a decoder conforming to the first profile responsive to either the indicator value indicating conformance to a third profile or the first picture not being a still picture. In other words, as indicated above, in some embodiments as illustrated in FIG. 7, the processing circuitry 401 in block 709, the processing circuitry 401 does not decode the first picture of the bitstream using a decoder conforming to the first profile responsive to either the indicator value indicating conformance to a third profile or the first picture is determined to not be a still picture. The third profile is different than the first profile and the second profile.

Turning to FIG. 11, in block 1101, the processing circuitry 401, responsive to the indicator value indicating conformance to the third profile or the first picture determined to not be a still picture, determines that the video bitstream does not conform to the first profile. This is because the first picture does not conform to the first profile. In some embodiments, as illustrated in FIG. 11, in block 1103, the processing circuitry 401, responsive to the indicator value indicating conformance to the third profile or the first picture determined to not be a still picture, determines that the decoder may not be capable of decoding the first picture of the video bitstream as indicated above.

Various operations from the flow chart of FIG. 6 may be optional with respect to some embodiments of communication devices and related methods. Regarding methods of example embodiment 1 (set forth below), for example, operations of blocks 607 and 609 of FIG. 6 may be optional.

Various operations from the flow chart of FIG. 7 may be optional with respect to some embodiments of communication devices and related methods. For example, in some embodiments, operations of blocks 707 and 709 may be optional.

Turning to FIG. 12, a further embodiment of inventive concepts is illustrated to determine whether the video bitstream conforms to the first profile. In block 1201, the processing circuitry 401 determines whether the first picture is the only picture in the bitstream. In block 1203, the processing circuitry 401, responsive to the indicator value indicating conformance to the second profile and the first picture determined to be a still picture and the first picture determined to be the only picture in the bitstream, determines that the decoder is capable of decoding the first picture of the video bitstream.

The still picture may be at least one of an image or picture that does not depend on (e.g. is not predicted from) any other picture, an IRAP picture, or a GDR picture with recovery POC count equal to 0. In other words, the still picture may be at least one of an image or picture that does not depend on any other picture, an image that does not predict from any other picture, an IRAP picture, or a GDR picture with recovery POC count equal to 0.

Figure 13:
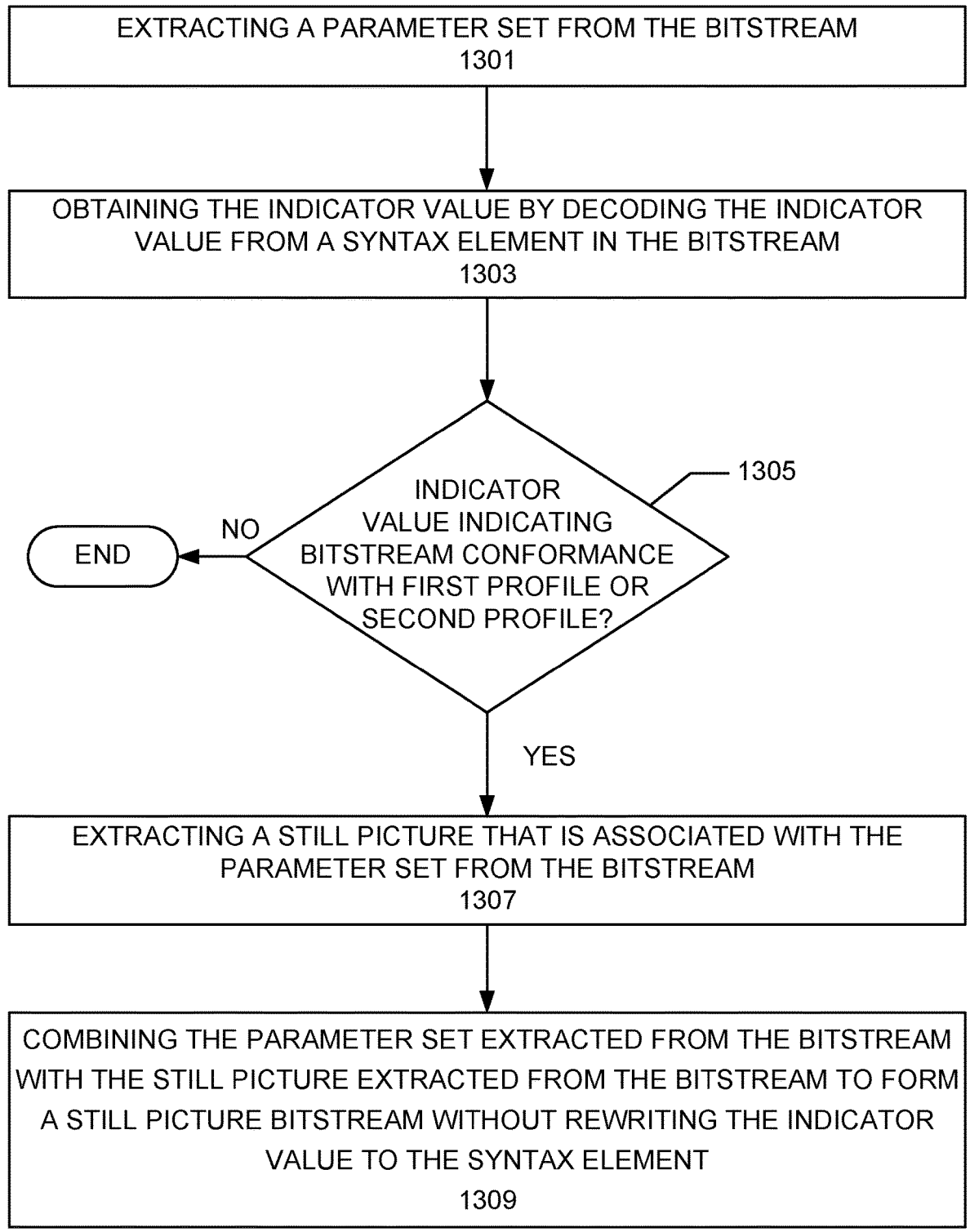

The decoder 306 may perform other actions that are inventive concepts such as forming a still picture bitstream. Turning to FIG. 13, in block 1301, the processing circuitry 401 may extract a parameter set from the bitstream. In block 1233, the processing circuitry 401 may obtain the indicator value by decoding the indicator value from a syntax element in the bitstream. Responsive to the indicator value indicating bitstream conformance with the first profile or the second profile in block 1305, the processing circuitry 401 may extract a still picture that is associated with the parameters set from the bitstream in block 1307 and combine the parameter set extracted from the bitstream with the still picture extracted from the bitstream to form a still picture bitstream without rewriting the indicator value to the syntax element in block 1309.

Example embodiments are discussed below.

Embodiment 1. A method for determining conformance of a video bitstream to a first profile, the method comprising:
  obtaining (601) an indicator value, the indicator value indicating conformance to a profile;
  determining (603) whether or not a first picture in the video bitstream is a still picture; and responsive (605) to the indicator value indicating conformance to a second profile and the first picture is a still picture, determining that the bitstream conforms to the first profile.

Embodiment 2. The method of Embodiment 1, further comprising:
  responsive to the indicator value indicating conformance to a third profile or the first picture determined to not be a still picture, determining (1101) that the video bitstream does not conform to the first profile.

Embodiment 3. The method of any of Embodiments 1-2 wherein obtaining the indicator value comprises decoding (801) the indicator value from a syntax element in the bitstream.

Embodiment 4. The method of any of Embodiments 1-2 wherein obtaining the indicator value comprises decoding (803) the indicator value from a syntax element in a decoding capability information, DCI, or in a parameter set;

Embodiment 5. The method of Embodiment 4 wherein the parameter set comprises one of a video parameter set, VPS, a sequence parameter set, SPS, or a picture parameter set, PPS.

Embodiment 6. The method of any of Embodiments 1-2 wherein obtaining the indicator value comprises obtaining (805) the indicator value from external means.

Embodiment 7. The method of any of Embodiments 1-6 wherein the first profile is a still picture profile.

Embodiment 8. The method of any of Embodiments 1-7 wherein the second profile is a video profile.

Embodiment 9. The method of any of Embodiments 1-8 wherein the second profile is different than the first profile.

Embodiment 10. The method of any of Embodiments 2-9 wherein the third profile is different than the first profile and the second profile.

Embodiment 11. The method of any of Embodiments 1-10 further comprising decoding (607) the bitstream using a decoder conforming to the first profile responsive to the indicator value indicating conformance to the second profile and the first picture being a still picture.

Embodiment 12. The method of any of Embodiments 2-11 further comprising not decoding (609) the bitstream using a decoder conforming to the first profile responsive to either the indicator value indicating conformance to the third profile or the first picture not being a still picture.

Embodiment 13. The method of any of Embodiments 1-12 wherein determining whether or not the first picture in the video bitstream is a still picture comprises determining whether or not the first picture is an intra random access point, IRAP, picture.

Embodiment 14. The method of any of Embodiments 1-12 wherein determining whether or not the first picture in the video bitstream is a still picture comprises obtaining one or more values from syntax elements, wherein the values from syntax elements specifies whether or not the first picture in the video bitstream is a still picture.

Embodiment 15. The method of any of Embodiments 1-12 wherein determining whether or not the first picture is a still picture comprises determining that the first picture is a still picture by:
  obtaining (901) a network abstraction layer, NAL, unit type of each video coding layer NAL unit of the first picture; and
  determining (903) that all video coding layer NAL units of the first picture have a NAL unit type representing an intra random access point, IRAP, picture.

Embodiment 16. The method of any of Embodiments 1-12 wherein determining whether or not the first picture is a still picture comprises determining that the first picture is a still picture by:
  decoding (1001) one or more values from one or more syntax elements from a picture header of the first picture or a slice header of the first picture; and
  determining (1003) from the one or more values that the picture is a still picture.

Embodiment 17. The method of any of Embodiments 1-16, further comprising
  determining (1201) whether or not the first picture is the only picture in the bitstream; and
  responsive to the indicator value indicating conformance to the second profile and the first picture determined to be a still picture and the first picture determined to be the only picture in the bitstream, determining (1203) that the bitstream conforms to the first profile.

Embodiment 18. The method of any of Embodiments 1-17, further comprising:
  extracting (1301) a parameter set from the bitstream;
  obtaining (1303) the indicator value by decoding the indicator value from a syntax element in the bitstream; and
  responsive to the indicator value indicating (1305) bitstream conformance with the first profile or the second profile:
    extracting (1307) a still picture that is associated with the parameter set from the bitstream; and
    combining (1309) the parameter set extracted from the bitstream with the still picture extracted from the bitstream to form a still picture bitstream without rewriting the indicator value to the syntax element.

Embodiment 19. A decoder (306) for determining conformance of a video bitstream to a first profile, the decoder adapted to perform operations comprising:
  obtaining (601) an indicator value, the indicator value indicating conformance to a profile;
  determining (603) whether or not a first picture in the video bitstream is a still picture; and
  responsive to the indicator value indicating conformance to a second profile and the first picture is a still picture, determining (605) that the bitstream conforms to the first profile.

Embodiment 20. The decoder (306) of Embodiment 19 wherein the decoder is further adapted to perform operations according to any of Embodiments 2-18.

Embodiment 21. A decoder (306) for determining conformance of a video bitstream to a first profile, the decoder comprising:
  processing circuitry (401); and
  memory (403) coupled with the processing circuitry, wherein the memory includes instructions that when executed by the processing circuitry causes the decoder to perform operations comprising:

obtaining (601) an indicator value, the indicator value indicating conformance to a profile;

determining (603) whether or not a first picture in the video bitstream is a still picture; and responsive to the indicator value indicating conformance to a second profile and the first picture is a still picture, determining (605) that the bitstream conforms to the first profile.

Embodiment 22. The decoder of Embodiment 21, wherein the memory includes further instructions that when executed by the processing circuitry causes the decoder to perform further operations comprising:

responsive to the indicator value indicating conformance to a third profile or the first picture determined to not be a still picture, determining (1101) that the video bitstream does not conform to the first profile.

Embodiment 23. The decoder of any of Embodiments 21-22 wherein in obtaining the indicator value, the memory includes further instructions that when executed by the processing circuitry causes the decoder to perform further operations comprising decoding (801) the indicator value from a syntax element in the bitstream.

Embodiment 24. The decoder of any of Embodiments 21-22 wherein in obtaining the indicator value, the memory includes further instructions that when executed by the processing circuitry causes the decoder to perform further operations comprising decoding (803) the indicator value from a syntax element in a decoding capability information, DCI, or in a parameter set Embodiment 25. The decoder of Embodiment 24 wherein the parameter set comprises one of a video parameter set, VPS, a sequence parameter set, SPS, or a picture parameter set, PPS.

Embodiment 26. The decoder of any of Embodiments 22-25 wherein in obtaining the indicator value, the memory includes further instructions that when executed by the processing circuitry causes the decoder to perform further operations comprising obtaining (805) the indicator value from external means.

Embodiment 27. The decoder of any of Embodiments 21-26 wherein the first profile is a still picture profile.

Embodiment 28. The decoder of any of Embodiments 21-27 wherein the second profile is a video profile.

Embodiment 29. The method of any of Embodiments 21-28 wherein the second profile is different than the first profile.

Embodiment 30. The decoder of any of Embodiments 22-29, wherein the third profile is different than the first profile and the second profile.

Embodiment 31. The decoder of any of Embodiments 21-30, wherein the memory includes further instructions that when executed by the processing circuitry causes the decoder to perform further operations comprising decoding (607) the bitstream using a decoder conforming to the first profile responsive to the indicator value indicating conformance to the second profile and the first picture being a still picture.

Embodiment 32. The decoder of any of Embodiments 21-31, wherein the memory includes further instructions that when executed by the processing circuitry causes the decoder to perform further operations comprising not decoding (609) the bitstream using a decoder conforming to the first profile responsive to either the indicator value indicating conformance to the third profile or the first picture not being a still picture.

Embodiment 33. The decoder of any of Embodiments 21-32 wherein in determining whether or not the first picture in the video bitstream is a still picture, the memory includes further instructions that when executed by the processing circuitry causes the decoder to perform further operations comprising determining whether or not the first picture is an intra random access point, IRAP, picture.

Embodiment 34. The method of any of Embodiments 21-32 wherein determining whether or not the first picture in the video bitstream is a still picture comprises obtaining one or more values from syntax elements, wherein the values from syntax elements specifies whether or not the first picture in the video bitstream is a still picture.

Embodiment 35. The decoder of any of Embodiments 21-32 wherein in determining whether or not the first picture is a still picture, the memory includes further instructions that when executed by the processing circuitry causes the decoder to perform further operations comprising determining that the first picture is a still picture by:

obtaining (901) a network abstraction layer, NAL, unit type of each video coding layer NAL unit of the first picture; and determining (903) that all video coding layer NAL units of the first picture have a NAL unit type representing an IRAP picture.

Embodiment 36. The decoder of any of Embodiments 21-32 wherein in determining whether or not the first picture is a still picture, the memory includes further instructions that when executed by the processing circuitry causes the decoder to perform further operations comprising determining that the first picture is a still picture by:

decoding (1001) one or more values from one or more syntax elements from a picture header of the first picture or a slice header of the first picture; and determining (1003) from the one or more values that the picture is a still picture.

Embodiment 37. The decoder of any of Embodiments 21-36, wherein the memory includes further instructions that when executed by the processing circuitry causes the decoder to perform further operations comprising:

determining (1201) whether or not the first picture is the only picture in the bitstream; and responsive to the indicator value indicating conformance to the second profile and the first picture determined to be a still picture and the first picture determined to be the only picture in the bitstream, determining (1203) that the bitstream conforms to the first profile.

Embodiment 38. The decoder of any of Embodiments 21-37, wherein the memory includes further instructions that when executed by the processing circuitry causes the decoder to perform further operations comprising:

extracting (1301) a parameter set from the bitstream;

obtaining (1303) the indicator value by decoding the indicator value from a syntax element in the bitstream; and responsive to the indicator value indicating (1305) bitstream conformance with the first profile or the second profile:

extracting (1307) a still picture that is associated with the parameter set from the bitstream; and combining (1309) the parameter set extracted from the bitstream with the still picture extracted from the bitstream to form a still picture bitstream without rewriting the indicator value to the syntax element.

Embodiment 39. A computer program comprising program code to be executed by processing circuitry (401) of a decoder (306), whereby execution of the program code causes the decoder (306) to perform operations comprising:

obtaining (601) an indicator value, the indicator value indicating conformance to a profile;

determining (603) whether or not a first picture in the video bitstream is a still picture; and responsive to the indicator value indicating conformance to a second profile and the first picture is a still picture, determining (605) that the bitstream conforms to a first profile.

Embodiment 40. The computer program of Embodiment 39, wherein the computer program comprises further program code to be executed by processing circuitry (401) of the decoder (306), whereby execution of the program code causes the decoder (306) to perform operations according to any of Embodiments 2-18.

Embodiment 41. A computer program product comprising a non-transitory storage medium including program code to be executed by processing circuitry (401) of a decoder (306), whereby execution of the program code causes the decoder (306) to perform operations comprising:

obtaining (601) an indicator value, the indicator value indicating conformance to a profile;

determining (603) whether or not a first picture in the video bitstream is a still picture; and responsive to the indicator value indicating conformance to a second profile and the first picture is a still picture, determining (605) that the bitstream conforms to a first profile.

Embodiment 42. The computer program product of Embodiment 41 wherein the non-transitory storage medium includes further program code to be executed by the processing circuitry (401) of the decoder (306), whereby execution of the program code causes the decoder (306) to perform operations according to any of Embodiments 2-18.

Explanations are provided below for various abbreviations/acronyms used in the present disclosure.

| Abbreviation | Explanation |
| --- | --- |
| AU | Access Unit |
| AUD | Access Unit Delimiter |
| ALF | Adaptive Loop Filter |
| APS | Adaptive Parameter Set |
| BDOF | Bi-Directional Optical Flow |
| BLA | Broken Link Access |
| CLVS | Coded Layer Video Sequence |
| CRA | Clean Random Access |
| CVS | Coded Video Stream |
| CVSS | CVS Start |
| CU | Coding Unit |
| DCI | Decoding Capability Information |
| DMVR | Decoder Motion Vector Refinement |
| DPS | Decoding Parameter Set |
| DRAP | Dependent Random Access Point |
| GDR | Gradual Decoding Refresh |
| HEVC | High-Efficiency Video Coding |
| IDR | Instantaneous Decoding Refresh |
| IRAP | Intra Random Access Point |
| LMCS | Luma Mapping and Chroma Scaling |
| MPEG | Motion Picture Experts Group |
| MVD | Motion Vector Difference |
| NAL | Network Abstraction Layer |
| NALU | NAL unit |
| NUT | NAL unit type |
| PPS | Picture Parameter Set |
| RADL | Random Access Decodable Leading |
| RAP | Random Access Point |
| RASL | Random Access Skipped Leading |
| RBSP | Raw Byte Sequence Payload |
| RPL | Reference Picture List |
| SEI | Supplemental Enhancement layer |
| SPS | Sequence Parameter Set |
| STSA | Step-wise Temporal Layer Access |
| VCL | Video Coding Layer |
| VPS | Video Parameter Set |
| VVC | Versatile Video Coding |

References are identified below.

1. JVET-50152-v5, Versatile Video Coding, Joint Video Experts Team

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for determining that a decoder configured to decode a picture in a bitstream conforming to a first profile is capable of decoding a first picture in a bitstream conforming to a second profile, wherein the first profile is a still picture profile and the second profile is a video profile, the method comprising:
   obtaining an indicator value, the indicator value indicating conformance of the bitstream to the first profile or the second profile;
   determining whether the first picture in the bitstream is a still picture; and
   responsive to the indicator value indicating conformance of the bitstream to the second profile and the first picture is determined to be a still picture, determining that the decoder is capable of decoding the first picture in the bitstream conforming to the second profile.

2. The method of claim 1, further comprising:
   responsive to the indicator value indicating conformance of the bitstream to a third profile or the first picture is determined not to be a still picture, performing at least one of:
   determining that the bitstream does not conform to the first profile; and
   determining that the decoder may not be capable of decoding the first picture of the bitstream,
   wherein the third profile is different than the first profile and the second profile.

3. The method of claim 1, wherein obtaining the indicator value comprises one of:
   decoding the indicator value from a syntax element in the bitstream; and
   obtaining the indicator value from external means.

4. The method of claim 3, wherein obtaining the indicator value comprises decoding the indicator value from a syntax element in a decoding capability information, DCI, or in a parameter set, wherein the parameter set comprises one of a video parameter set, VPS, sequence parameter set, SPS, or a picture parameter set, PPS.

5. The method of claim 1, further comprising:
decoding the first picture of the bitstream using a decoder configured to decode a picture in a bitstream conforming to the first profile responsive to the indicator value indicating conformance of the bitstream to the second profile and the first picture is determined to be a still picture, or
not decoding the first picture of the bitstream using a decoder configured to decode a picture in a bitstream conforming to the first profile responsive to either the indicator value indicating conformance of the bitstream to a third profile, wherein the third profile is different than the first profile and the second profile, or the first picture is determined not to be a still picture.

6. The method of claim 1, wherein determining whether the first picture in the bitstream is a still picture comprises at least one of:
determining whether the first picture is an intra random access point, IRAP, picture;
determining whether the first picture is a gradual decoding refresh, GDR, picture with a recovery picture order count, POC, count equal to 0;
obtaining one or more values from syntax elements, wherein the one or more values from syntax elements specifies whether the first picture in the bitstream is a still picture;
decoding one or more values from one or more syntax elements from a picture header of the first picture, from a slice header of the first picture, or from an access unit delimiter (AUD) associated with the first picture and determining from the one or more values that the picture is a still picture; and
obtaining a network abstraction layer, NAL, unit type of each video coding layer NAL unit of the first picture and determining that all video coding layer NAL units of the first picture have a NAL unit type representing an intra random access point, IRAP, picture.

7. The method of claim 1, further comprising:
determining whether the first picture is an only picture in the bitstream; and
responsive to the indicator value indicating conformance of the bitstream to the second profile and the first picture determined to be a still picture and the first picture determined to be the only picture in the bitstream, determining that the decoder is capable of decoding the first picture of the bitstream.

8. The method of claim 1, further comprising:
extracting a parameter set from the bitstream;
obtaining the indicator value by decoding the indicator value from a syntax element in the bitstream; and
responsive to the indicator value indicating bitstream conformance with the first profile or the second profile:
extracting a still picture that is associated with the parameter set from the bitstream; and
combining the parameter set extracted from the bitstream with the still picture extracted from the bitstream to form a still picture bitstream without rewriting the indicator value to the syntax element.

9. The method of claim 1, wherein the still picture is at least one of:
an image or picture that does not depend on any other picture;
an image or picture that does not predict from any other picture;
an IRAP picture; and
a GDR picture with recovery POC count equal to 0.

10. The method of claim 1, wherein the decoder configured to decode a picture in a bitstream conforming to the first profile is part of a device having a media player.

11. A decoder for determining that the decoder configured to decode a picture in a bitstream conforming to a first profile is capable of decoding a first picture in a bitstream conforming to a second profile, wherein the first profile is a still picture profile and the second profile is a video profile, the decoder comprising:
processing circuitry; and
memory coupled with the processing circuitry, wherein the memory includes instructions that when executed by the processing circuitry causes the decoder to perform operations comprising:
obtaining an indicator value, the indicator value indicating conformance of the bitstream to the first profile or the second profile;
determining whether the first picture in the bitstream is a still picture; and
responsive to the indicator value indicating conformance to the second profile and the first picture is determined to be a still picture, determining that the decoder configured to decode a picture in a bitstream conforming to the first profile is capable of decoding the first picture in the bitstream.

12. The decoder of claim 11, wherein the memory includes further instructions that when executed by the processing circuitry causes the decoder to perform further operations comprising at least one of:
responsive to the indicator value indicating conformance of the bitstream to a third profile or the first picture is determined to not be a still picture, determining that the bitstream does not conform to the first profile; and
responsive to the indicator value indicating conformance of the bitstream to the third profile or the first picture determined to not be a still picture, determining that the decoder may not be capable of decoding the first picture of the bitstream,
wherein the third profile is different than the first profile and the second profile.

13. The decoder of claim 11 wherein in obtaining the indicator value, the memory includes further instructions that when executed by the processing circuitry causes the decoder to perform further operations comprising at least one of:
decoding the indicator value from a syntax element in the bitstream; and
obtaining the indicator value from external means.

14. The decoder of claim 13, wherein in obtaining the indicator value, the memory includes further instructions that when executed by the processing circuitry causes the decoder to perform further operations comprising decoding (803) the indicator value from a syntax element in a decoding capability information, DCI, or in a parameter set, wherein the parameter set comprises one of a video parameter set, VPS, a sequence parameter set, SPS, or a picture parameter set, PPS.

15. The decoder of claim 11, wherein the memory includes further instructions that when executed by the processing circuitry causes the decoder to perform further operations comprising one of:
decoding the first picture of the bitstream using a decoder configured to decode a picture in a bitstream conforming to the first profile responsive to the indicator value indicating conformance of the bitstream to the second profile and the first picture is determined to be a still picture; and not decoding the first picture of the bitstream using a decoder configured to decode a picture in a bitstream conforming to the first profile responsive to either the indicator value indicating conformance of the bitstream to a third profile, wherein the third profile is different than the first profile and the second profile, or the first picture is determined to not be a still picture.

16. The decoder of claim 11, wherein in determining whether the first picture in the bitstream is a still picture, the memory includes further instructions that when executed by the processing circuitry causes the decoder to perform further operations comprising at least one of:
  determining whether the first picture is an intra random access point, IRAP, picture;
  determining whether the first picture is a GDR picture with recovery POC count equal to 0;
  obtaining one or more values from syntax elements, wherein the values from syntax elements specifies whether the first picture in the bitstream is a still picture;
  decoding one or more values from one or more syntax elements from a picture header of the first picture, from a slice header of the first picture, or from an access unit delimiter (AUD) associated with the first picture and determining from the one or more values that the picture is a still picture; and
  obtaining a network abstraction layer, NAL, unit type of each video coding layer NAL unit of the first picture and determining that all video coding layer NAL units of the first picture have a NAL unit type representing an IRAP picture.

17. The decoder of claim 11, wherein the memory includes further instructions that when executed by the processing circuitry causes the decoder to perform further operations comprising:
  determining whether the first picture is an only picture in the bitstream; and
  responsive to the indicator value indicating conformance of the bitstream to the second profile and the first picture is determined to be a still picture and the first picture is determined to be the only picture in the bitstream, determining that the decoder is capable of decoding the first picture of the bitstream.

18. The decoder of claim 11, wherein the memory includes further instructions that when executed by the processing circuitry causes the decoder to perform further operations comprising:
  extracting a parameter set from the bitstream;
  obtaining the indicator value by decoding the indicator value from a syntax element in the bitstream; and
  responsive to the indicator value indicating bitstream conformance with the first profile or the second profile:
    extracting a still picture that is associated with the parameter set from the bitstream; and
    combining the parameter set extracted from the bitstream with the still picture extracted from the bitstream to form a still picture bitstream without rewriting the indicator value to the syntax element.

19. The decoder of claim 11, wherein a still picture is at least one of:
  an image or picture that does not depend on any other picture;
  an image or picture that is not predicted from any other picture;
  an IRAP picture; and
  a GDR picture with recovery POC count equal to 0.

20. The decoder of claim 11 wherein the decoder is part of a device having a media player.

21. A computer program product comprising a non-transitory storage medium including program code to be executed by processing circuitry of a decoder conforming to a first profile, the first profile being a still picture profile, whereby execution of the program code causes the decoder to perform operations comprising:
  obtaining an indicator value, the indicator value indicating conformance to the first profile or the second profile;
  determining whether a first picture in a bitstream is a still picture; and
  responsive to the indicator value indicating conformance to a second profile, the second profile being a video profile, and the first picture is determined to be a still picture, determining that the decoder conforming to the first profile is capable of decoding the first picture of the bitstream.

* * * * *